US012594738B2

(12) United States Patent
Cheich et al.

(10) Patent No.: US 12,594,738 B2
(45) Date of Patent: Apr. 7, 2026

(54) FORMING ASSEMBLY FOR A DUNNAGE CONVERSION MACHINE, DUNNAGE CONVERSION MACHINE AND PRE-PREPARED SHEET STOCK MATERIAL

(71) Applicant: Ranpak Corp., Concord Township, OH (US)

(72) Inventors: Robert C. Cheich, Independence, OH (US); Dennis J. Wagner, Painesville, OH (US); Peter L.C. Lemmens, Gronsveld (NL); Rob A.H. Pluijmen, Landgraaf (NL)

(73) Assignee: Ranpak Corp., Concord Township, OH (US)

( * ) Notice: Subject to any disclaimer, the term of this patent is extended or adjusted under 35 U.S.C. 154(b) by 340 days.

(21) Appl. No.: 17/432,051

(22) PCT Filed: Feb. 12, 2020

(86) PCT No.: PCT/US2020/017828

§ 371 (c)(1),
(2) Date: Aug. 18, 2021

(87) PCT Pub. No.: WO2020/176257

PCT Pub. Date: Sep. 3, 2020

(65) Prior Publication Data

US 2022/0184914 A1 Jun. 16, 2022

Related U.S. Application Data

(60) Provisional application No. 62/812,059, filed on Feb. 28, 2019.

(51) Int. Cl.
*B31D 5/00* (2017.01)

(52) U.S. Cl.
CPC ......... *B31D 5/0047* (2013.01); *B31D 5/0052* (2013.01); *B31D 5/006* (2013.01);
(Continued)

(58) Field of Classification Search
CPC .... B31D 5/0047; B31D 5/0052; B31D 5/006; B31D 2205/0047; B31D 2205/0058; B31D 2205/0082
(Continued)

(56) References Cited

U.S. PATENT DOCUMENTS 4,750,896 A 6/1988 Komaransky et al.
5,123,889 A 6/1992 Armington et al.
(Continued)

FOREIGN PATENT DOCUMENTS

CN 103817719 A 5/2014
CN 208052117 U 11/2018
(Continued)

OTHER PUBLICATIONS

International Search Report and Written Opinion issued Aug. 11, 2020, for International Patent Application No. PCT/US2020/017828.
(Continued)

*Primary Examiner* — Sameh Tawfik
(74) *Attorney, Agent, or Firm* — Renner, Otto, Boisselle & Sklar, LLP

(57) ABSTRACT

A cushioning conversion machine converts a sheet stock material into a relatively lower-density cushioning dunnage product. An exemplary sheet stock material includes two sheets that each overlap a common side of another sheet and are connected to respective lateral edges of the other sheet. The conversion machine includes a forming assembly having a former for shaping and randomly crumpling the sheet material, a set of adjustable guide members to guide the
(Continued)

crumpled sheet material to a feeding assembly downstream of the forming assembly, and a severing assembly downstream of the feeding assembly that separates discrete lengths of cushioning. The severing assembly includes a window frame passage that guides the crumpled sheet material to an outlet during operation of the feeding assembly and constrains the crumpled sheet stock material during operation of the severing assembly.

13 Claims, 14 Drawing Sheets

(52) U.S. Cl.
CPC ................ *B31D 2205/0047* (2013.01); *B31D 2205/0058* (2013.01); *B31D 2205/0082* (2013.01)

(58) Field of Classification Search
USPC .......................................................... 493/346
See application file for complete search history.

(56) References Cited

U.S. PATENT DOCUMENTS

| | | | | |
|---|---|---|---|---|
| 5,322,477 | A | 6/1994 | Armington et al. | |
| 6,120,428 | A | 9/2000 | Ratzel | |
| 2002/0082152 | A1 * | 6/2002 | Manley | B31D 5/0047 493/464 |
| 2003/0139272 | A1 | 7/2003 | Simmons, Jr. | |
| 2017/0266907 | A1 * | 9/2017 | Chan | B31D 5/0047 |
| 2018/0326687 | A1 * | 11/2018 | Wetsch | B31D 5/0047 |
| 2019/0099975 | A1 * | 4/2019 | Chan | B65H 20/16 |

FOREIGN PATENT DOCUMENTS

| | | | |
|---|---|---|---|
| JP | H11506988 | A | 6/1999 |
| WO | 2001098071 | A2 | 12/2001 |
| WO | 2018160607 | A1 | 9/2018 |

OTHER PUBLICATIONS

International Preliminary Report on Patentability issued May 7, 2021, for International Patent Application No. PCT/US2020/017828.

* cited by examiner

FORMING ASSEMBLY FOR A DUNNAGE CONVERSION MACHINE, DUNNAGE CONVERSION MACHINE AND PRE-PREPARED SHEET STOCK MATERIAL

FIELD OF THE INVENTION

This invention relates generally to a dunnage conversion machine that converts a sheet stock material into a cushioning dunnage product useful for packaging.

BACKGROUND

In the process of shipping an item from one location to another, a protective packaging material is typically placed in the shipping case, or box, to fill any voids or to cushion the item during the shipping process. Some conventional protective packaging materials are plastic foam peanuts and plastic bubble pack. Paper protective packaging material is a very popular alternative to conventional plastic packaging materials. Paper is biodegradable, recyclable and made from a renewable resource, making it an environmentally responsible choice for conscientious industries.

While paper in sheet form could be used as a protective packaging material, packaging companies usually prefer to convert the sheets of paper into a relatively lower density dunnage product to provide improved protection. This conversion may be accomplished by a dunnage conversion machine, such as those disclosed in commonly assigned U.S. Pat. Nos. 5,123,889 and 5,322,477. Dunnage conversion machines typically convert a sheet stock material, such as paper, into a strip of dunnage having a lower density than the original stock material. Dunnage products of a desired length are severed or cut from the strip for use in packaging applications.

SUMMARY

The present invention provides a cushioning conversion machine and method for converting a sheet stock material into a relatively less dense dunnage product having improved cushioning properties, and more particularly, into a cushioning product formed from stock material having its lateral regions inwardly turned and connected along a narrow central band, leaving an increased amount of stock material in randomly-crumpled lateral pillow portions, and providing improved cushioning properties in the pillow portions.

To that end, the present invention provides a cushioning dunnage conversion machine converts a sheet stock material into a relatively lower-density cushioning product, where the sheet stock material includes two sheets that overlap and are connected to lateral edges of another sheet. The conversion machine includes a forming assembly having a former for shaping and randomly crumpling the sheet material, adjustable guide members to guide the crumpled sheet material to a feeding assembly downstream of the forming assembly with a controlled maximum dimension, and a severing assembly downstream of the feeding assembly that separates discrete lengths of cushioning. The severing assembly includes a window frame that guides the crumpled sheet material to an outlet during operation of the feeding assembly and constrains the crumpled sheet stock material during operation of the severing assembly.

More particularly, the present invention provides a forming assembly for a cushioning conversion machine that includes an internal forming device. The internal forming device has a height dimension, a width dimension perpendicular to the height dimension, and a length dimension perpendicular to both the height dimension and the width dimension. The internal forming device further includes a bottom surface, and a pair of laterally-spaced lengthwise-extending protrusions that protrude from a common side of the bottom surface. The width dimension of the internal forming device decreases from an upstream end to a downstream end spaced from the upstream end along the length dimension, and the height dimension of the protrusions increases from the upstream end to the downstream end such that the protrusions include wedge-shape volumes. These wedge-shape volumes of the protrusions extend along converging axes, but the protrusions also include a pair of laterally-spaced lengthwise-extending parallel ridges, which also may be referred to as shoulders, that protrude above the wedge-shape volumes and are spaced inwardly from laterally-outer edges of the wedge-shape volumes.

The internal forming device may have a uniformly-thick central region between the laterally-spaced protrusions. This central region may include a flat upper surface between the laterally-spaced protrusions.

The bottom surface of the internal forming device may be flat or planar.

The parallel ridges may extend from the upstream end a distance less than the length dimension. The resulting internal forming device may include a step change in a height of an upper surface of the laterally-spaced protrusions laterally outwardly positioned relative to the parallel ridges.

The protrusions may further include laterally outer cavities extending laterally inwardly from laterally outer extents of the wedge-shape volumes, and the protrusions may have circular cross-sections at the downstream end of the internal forming device.

In one or more embodiments, the internal forming device may be symmetric about a lengthwise-extending vertical plane, and each of the laterally-spaced protrusions may be a mirror image of the other about a lengthwise-extending vertical plane.

The forming assembly may further include a mounting element secured to the internal forming device adjacent the upstream end between the protrusions.

In one or more embodiments, the internal forming device may further include a laterally-centered rudder that extends at least one of beyond a bottom surface of the internal forming device in a direction opposite the protrusions and beyond an upstream end of the internal forming device.

The forming assembly also may include an external forming device that includes a converging chute that converges from an inlet at an upstream end to a relatively smaller outlet at a downstream end, where the internal forming device is telescopically received within the external forming device. The internal forming device may be mounted to the external forming device.

The present invention also provides a cushioning conversion machine with a conversion assembly having a forming assembly for shaping a sheet stock material into a relatively lower density strip of dunnage, a feeding assembly downstream of the forming assembly with at least one rotating element to draw the strip of dunnage through the forming assembly, and a set of guide walls between the forming assembly and the feeding assembly to guide the strip of dunnage along a path from the forming assembly to the feeding assembly. The set of guide walls includes at least one adjustable guide wall that is pivotally mounted at an upstream end adjacent the forming assembly and selectively positionable in any of a plurality of predetermined positions to vary at least one dimension of the path between the forming assembly and the feeding assembly.

The set of guide walls may include a guide plate with a plurality of circumferentially-spaced apertures and a pair of laterally-spaced adjustable guide walls having tabs that are receivable in corresponding apertures. The guide plate may extend from the forming assembly and through the feeding assembly.

The adjustable guide walls may be curved to provide a convex surface that faces the path. And the set of guide walls may circumferentially bound the path.

Finally, the present invention provides a dunnage conversion machine having a conversion assembly for converting a sheet stock material into a relatively lower density dunnage product. The conversion assembly includes a feeding assembly having at least one rotating element to advance the sheet stock material along a path through the conversion assembly, and a severing assembly downstream of the feeding assembly to sever discrete lengths of dunnage products from the sheet stock material. The severing assembly includes a stationary cutting blade and a driven cutting blade that is moveable relative to the stationary cutting blade across the path of the sheet stock material to sever discrete dunnage products from the sheet stock material. The severing assembly further includes a translating frame movable with the driven cutting blade between a feeding position and a severing position removed from the feeding position. The translating frame includes a passage that is aligned with the path of the sheet stock material in the feeding position and blocks the path of the sheet stock material in the severing position. The translating frame includes a crossbar that defines a side of the passage and redirects the sheet stock material to the path as the frame moves from the severing position to the feeding position.

The translating frame may translate its position without rotating as it moves from the feeding position to the severing position. The driven cutting blade may be mounted to the translating frame adjacent the passage.

The severing assembly may include a guide member to which the translating frame is mounted to guide the translating movement of the translating frame between the feeding position and the severing position.

These and other features of the present invention are described in detail in the following description and accompanying drawings.

DETAILED DESCRIPTION

Figure 1:
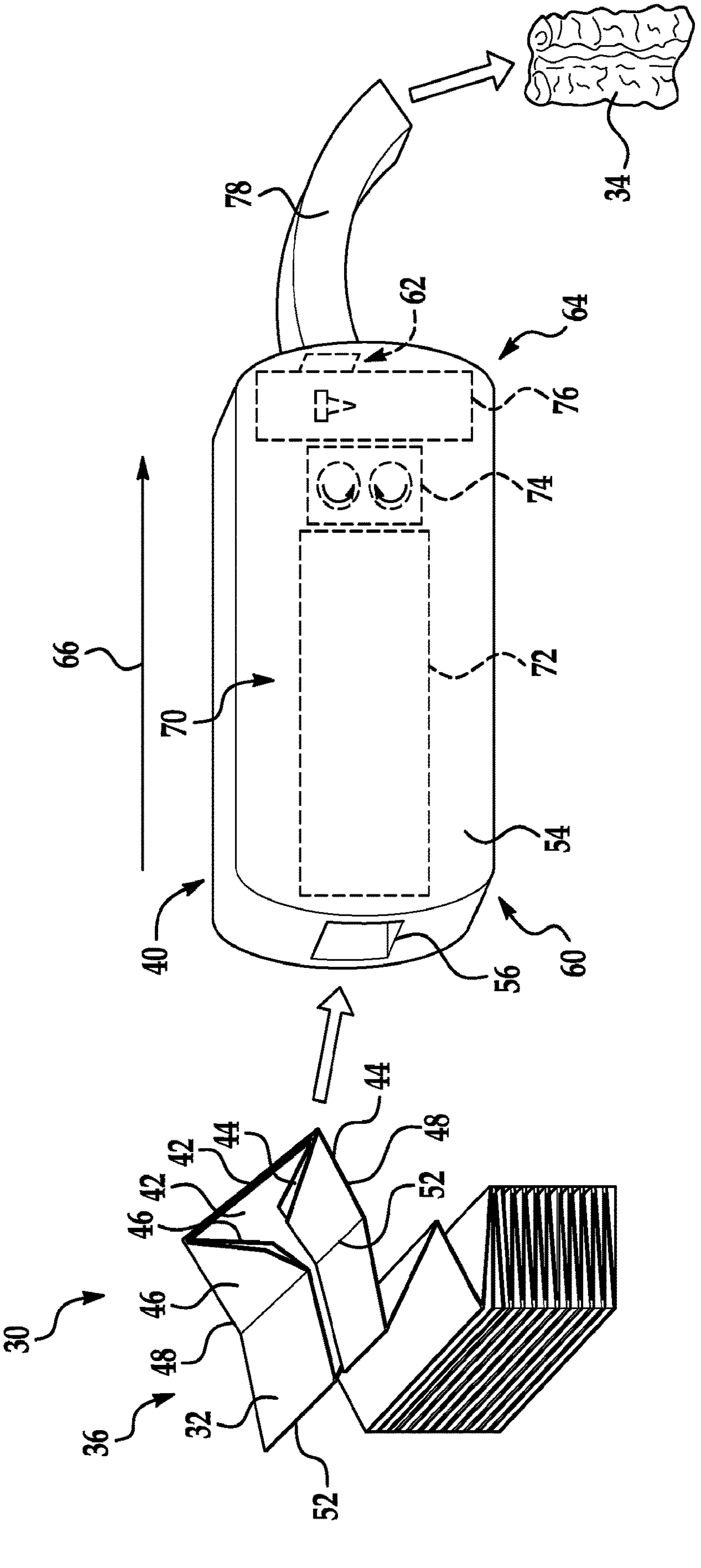
FIG. 1 is a schematic illustration of a system including a dunnage conversion machine for converting a sheet stock material into a relatively less dense dunnage product.

With reference to the drawings, FIG. 1 schematically illustrates an exemplary dunnage conversion system 30 provided by the present invention for converting a sheet stock material 32 into a relatively less dense dunnage product 34. The system includes a supply 36 of sheet stock material 32 and a dunnage conversion machine 40 for converting that stock material 32 into relatively lower density dunnage products 34, particularly cushioning products. Cushioning dunnage products also may be referred to as pads, and a dunnage conversion machine that produces cushioning dunnage products may be referred to as a cushioning conversion machine.

Supply of Sheet Stock Material

The sheet stock material 32 intended for use with the conversion machine 40 provided by the invention has a special configuration that allows the conversion machine 40 to be shorter and take up less space. The supply 36 may include one or more plies of sheet stock material 32, and at least one ply preferably includes paper. Paper is biodegradable, recyclable, and composed of a renewable resource, making it an environmentally-responsible choice. The sheet stock material 32 in the supply may be wound into a roll or fan-folded into a rectangular stack, as shown.

While a traditional flat sheet stock material may be used in the conversion machine 40 provided by the invention, the conversion machine is designed for use with a pre-prepared sheet stock material 32. Accordingly, the sheet stock material 32 also may be referred to as sheet material or stock material or pre-prepared stock material. Some examples are shown in FIGS. 1-5. Specifically, the sheet stock material 32 is configured with a base layer 42 and two additional layers 44 and 46 overlapping the base layer 42 and connected to lateral regions of the base layer 42, and thus may be referred to as a multi-layer sheet stock material 32. This arrangement alternatively can be described as a first sheet 42 connected at its lateral extents to an edge of respective second sheets 44 and 46 overlapping a common side of the first sheet 42. The second sheets 44 and 46 that typically are not as wide as the first sheet 42, such that there is little to no overlap between the second sheets 44 and 46. Or expressed another way, the sheet stock material 32 has a central portion 42 and two lateral portions 44 and 46 overlaying a common side of the central portion 42 and connected at respective edges to lateral extents of the central portion 42.

Figure 2:
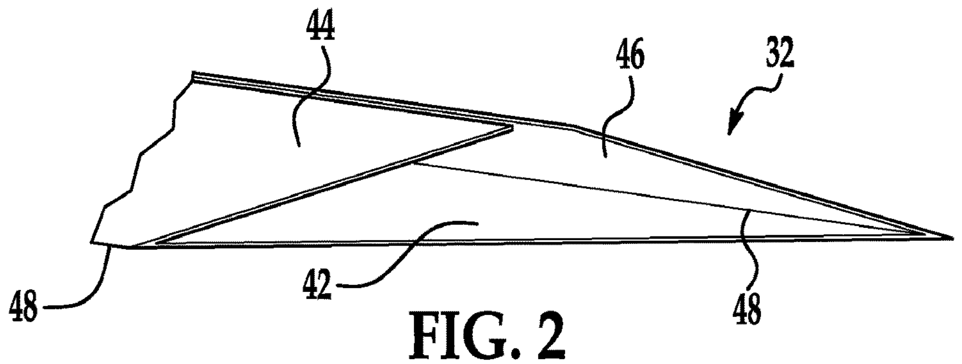
FIG. 2 is a schematic illustration of a single-ply pre-prepared sheet stock material suitable for conversion into a dunnage product.
Figure 3:
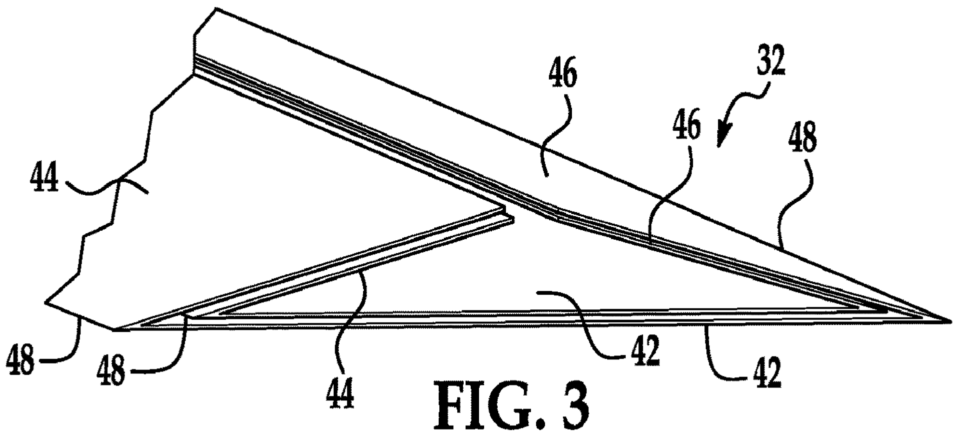
FIG. 3 is a schematic illustration of a multi-ply pre-prepared sheet stock material suitable for conversion into a dunnage product.

This pre-prepared sheet stock material 32 may be formed by folding the lateral portions 44 and 46 of a flat sheet stock material inwardly along longitudinally-extending fold lines 48 over a common side of a central portion 42 of the sheet stock material. A single-ply example is shown in FIG. 2, and a multi-ply example, specifically a two-ply example, is shown in FIGS. 1 and 3. Each ply has lateral portions 44 and 46 inwardly folded along a longitudinal fold line 48 over a common side of a center portion 42.

Figure 4:
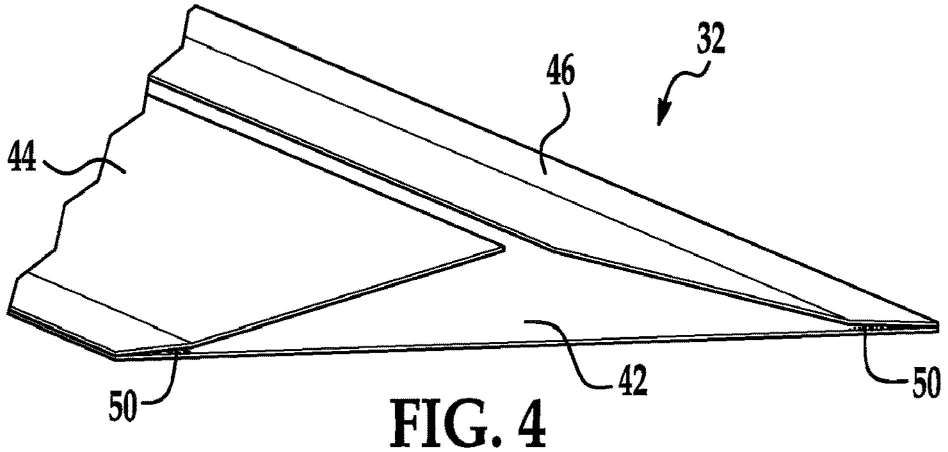
FIG. 4 is a schematic illustration of another pre-prepared sheet stock material suitable for conversion into a dunnage product.
Figure 5:
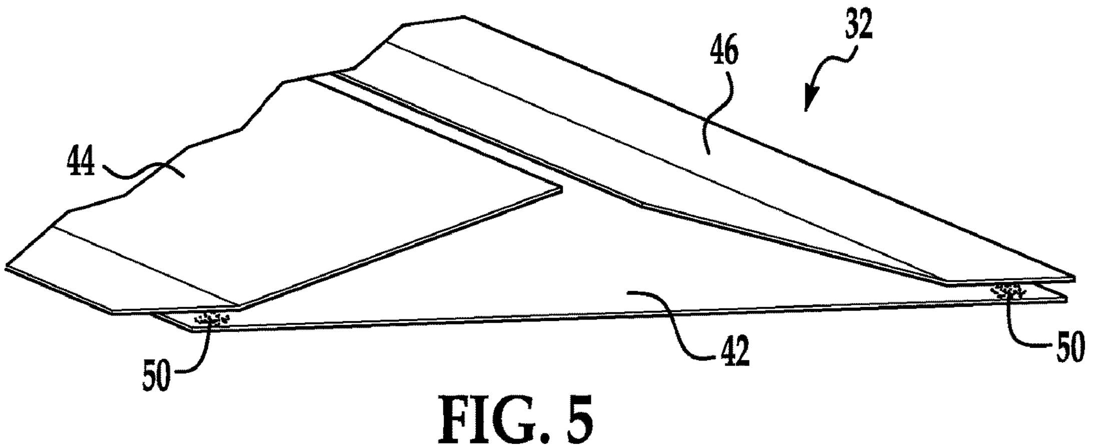
FIG. 5 is a schematic illustration of a yet another pre-prepared sheet stock material suitable for conversion into a dunnage product.

Alternatively, the pre-prepared sheet stock material 32 may be formed by connecting separate lateral portions 44 and 46 (alternatively referred to as second sheets or additional layers using the terms in the foregoing examples) to a common side of the central portion 42 (alternatively referred to as a first sheet or a base layer using the terms in the foregoing examples) adjacent lateral edges of the central portion 42 as shown in FIGS. 4 and 5. In FIG. 5 the second sheets 44 and 46 extend laterally outward beyond the lateral edges of the first sheet 42. The connection may be defined by fold lines 48 (as shown in FIGS. 1 to 3) or may be formed by an adhesive 50 (as shown in FIGS. 4 and 5) or other connection means, for example a mechanical connection. This pre-prepared sheet stock material 32 then may be wound into a cylindrical roll or fan-folded in alternating directions about transverse fold lines 52 (FIG. 1) into a rectangular stack for storage or transport until ready for use in a dunnage conversion machine 40.

Dunnage Conversion Machine

Returning to FIG. 1, the illustrated dunnage conversion machine 40 includes a housing 54 having an inlet 56 at an upstream end 60 and an outlet 62 at a downstream end 64 opposite the upstream end 60. The terms "upstream" and "downstream" in this context are characteristic of the direction of flow of the stock material 32 from the supply 36 and through the conversion machine 40 from the upstream end 60 toward the downstream end 64. The direction from the upstream end 60 to the downstream end 64 also may be referred to alternatively as a feed direction or a downstream direction 66. An upstream direction is opposite the downstream direction 66.

As shown, the housing 54 is positioned in a substantially horizontal manner whereby an imaginary longitudinal line or axis extending from the upstream end 60 to the downstream end 64 would be substantially horizontal. The conversion machine 40 is not intended to be limited to the illustrated orientation, however, as the conversion machine 40 may be used in other orientations, such as in a vertical orientation. The conversion machine 40 further includes a frame (not shown) within the housing 54 that supports the internal components of the conversion machine 40.

Those internal components of the dunnage conversion machine 40 include conversion assemblies (also collectively referred to as the conversion assembly 70) that draw the sheet stock material 32 from the supply 36, convert the sheet stock material 32 into a continuous unconnected strip and then a connected strip having lateral pillow portions with randomly crumpled sheet stock material separated by a narrow central band. Discrete dunnage products 34 are then separated from the connected strip in desired lengths.

In conventional cushioning conversion machines, such as ones similar to the machine described in U.S. Pat. No. 5,322,477, the conversion assembly includes a forming assembly that inwardly turns lateral edges of a flat sheet stock material, and this inward turning required a certain distance along the feed direction to avoid tearing or other problems as the sheet material advances through the forming assembly. By providing the pre-prepared sheet stock material 32 with its lateral portions 44 and 46 already inwardly-extending over the central portion 42, the present invention provides a forming assembly 72 that does not have to inwardly turn lateral edges of a flat sheet stock material, which means that the length of the forming assembly 72 in the feed direction 66 can be reduced. In other words, the formation of a pre-prepared multi-layer stock material 32 such as that described above, prior to feeding the sheet stock material 32 into the inlet 56 at the upstream end 60 of the conversion machine 40 facilitates reducing the size, specifically the length, of the forming assembly 72, and thus of the conversion machine 40, without significantly changing the quality of the protective cushioning properties of the resulting dunnage product 34. Additionally, because the forming assembly 72 does not have to inwardly turn the lateral portions 44 and 46 of the pre-prepared sheet stock material 32, a risk of tearing of the sheet stock material during conversion also is reduced.

Accordingly, the conversion assembly 70 provided by the present invention includes a forming assembly 72 that separates the overlapping layers 42, and 44 and 46 of the pre-prepared sheet stock material 32, opening up the sheet stock material 32 and separating the lateral portions 44 and 46 from the central portion 42 such that the lateral portions 44 and 46 are no longer parallel to the central portion 42, while randomly crumpling and otherwise shaping the sheet stock material 32 as it moves through the forming assembly 72. In doing so the forming assembly 72 can be shorter than in a forming assembly designed for flat sheet stock material of an equivalent overall width (the combined width of the lateral portions and the central portion).

As the sheet stock material 32 moves through the forming assembly 72, the sheet stock material 32 randomly crumples to provide exemplary cushioning properties. The forming assembly 72 forms the general shape of the cushioning dunnage product 34 and facilitates random crumpling of the sheet material as the sheet material is drawn through the forming assembly 72. The forming assembly 72 thus converts the sheet stock material 32 into a relatively lower-density, unconnected strip of cushioning dunnage.

The conversion assembly 70 further includes a feeding assembly 74, which draws the sheet stock material 32 from the supply 36 and through the forming assembly 72. The feeding assembly 74 not only pulls the sheet stock material 32 through the forming assembly 72, but also may connect or stitch a central band of overlapping layers in the unconnected strip to form a connected strip of cushioning. The connection of the overlapping layers helps the strip of cushioning, and resulting cushioning products, retain their shape. Alternatively, the feeding and connecting functions of the feeding assembly 74 may be separated and performed by different mechanisms.

Finally, the conversion assembly 70 may include a severing assembly 76 to separate discrete sections or dunnage products 34 (FIG. 1) of a desired length from the connected strip. As the connected strip travels downstream from the feeding assembly 74, the severing assembly 76 is selectively operable to cut or otherwise separate from the connected strip one or more sections of a desired length, which may be referred to as discrete cushioning products or pads 34. The discrete cushioning products 34 separated from the strip pass through the outlet 62 at the downstream end of the housing 54 and through an outlet chute 78 to exit the conversion machine 40. The sheet stock material 32 thus progresses in a downstream direction 66 from the supply 36 and through the conversion assembly 70, specifically through the forming assembly 72, the feeding assembly 74, and the severing assembly 76 in sequence, to form the cushioning dunnage product 34, which has a lower density and improved cushioning properties as compared to the starting sheet stock material 32.

Forming Assembly

Turning now to further details of the improved forming assembly 72 provided by the invention as shown in FIGS. 6 to 11, the forming assembly 72 includes an internal forming device 90, often referred to as a former, and optionally may include an external forming device 92. The external forming device 92 converges from a relatively larger inlet 94 at an upstream end to a relatively smaller outlet 96 at a downstream end and may be referred to as a converging chute 92. The internal forming device 90 is mounted to extend into the external forming device 92, such that the external forming device 92 telescopically receives the internal forming device 90. The stock material 32 travels through the external forming device 92 and around the internal forming device 90 as it passes through the forming assembly 72 to form the unconnected strip of randomly crumpled stock material. A central portion of the stock material 32 travels between a bottom surface 100 of the internal forming device 90 and an inner surface of the external forming device 92 as shown, or in the absence of the external forming device 92, between the bottom surface 100 of the internal forming device 90 and a guide plate 176 (FIG. 19) spaced from and approximately parallel to the bottom surface 100 of the internal forming device 72 (corresponding to bottom surface 174 in FIG. 19).

The internal forming device or former 90 has a generally flat bottom surface 100 in the shape of an isosceles triangle with rounded corners. A downstream end 104 of the former 90 is formed by a corner of the triangular shape formed between equal-length long first and second sides 106 and 108, with a shorter third side 110 of the triangular shape forming an upstream end 112 of the former 90.

Figure 6:
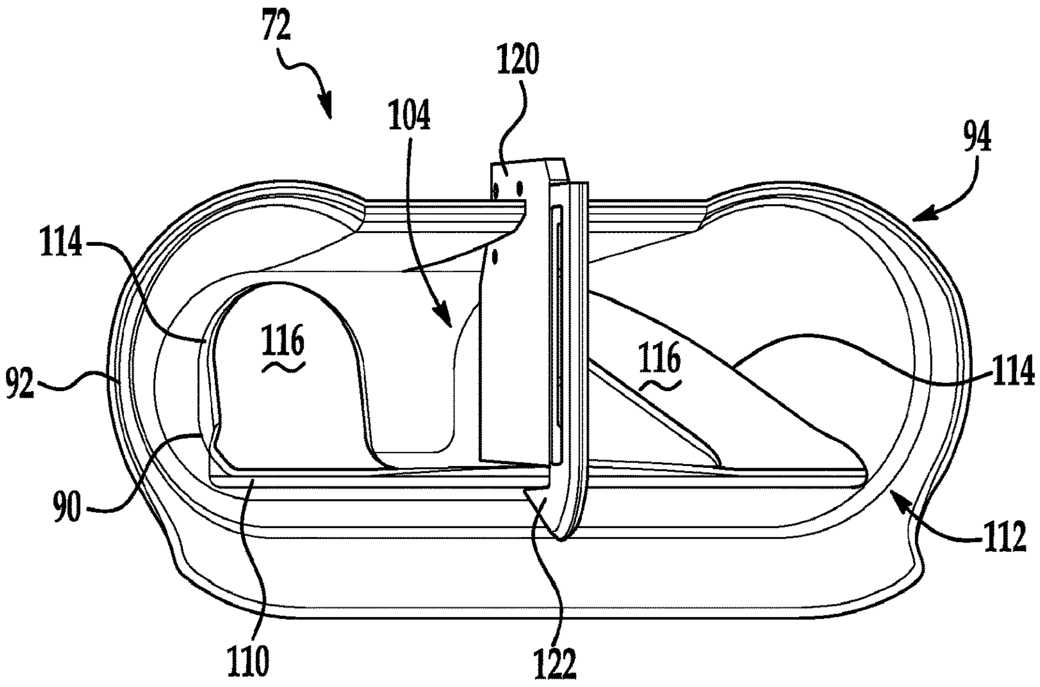
FIG. 6 is a perspective view of an exemplary forming assembly provided by the invention for a dunnage conversion machine.
Figure 7:
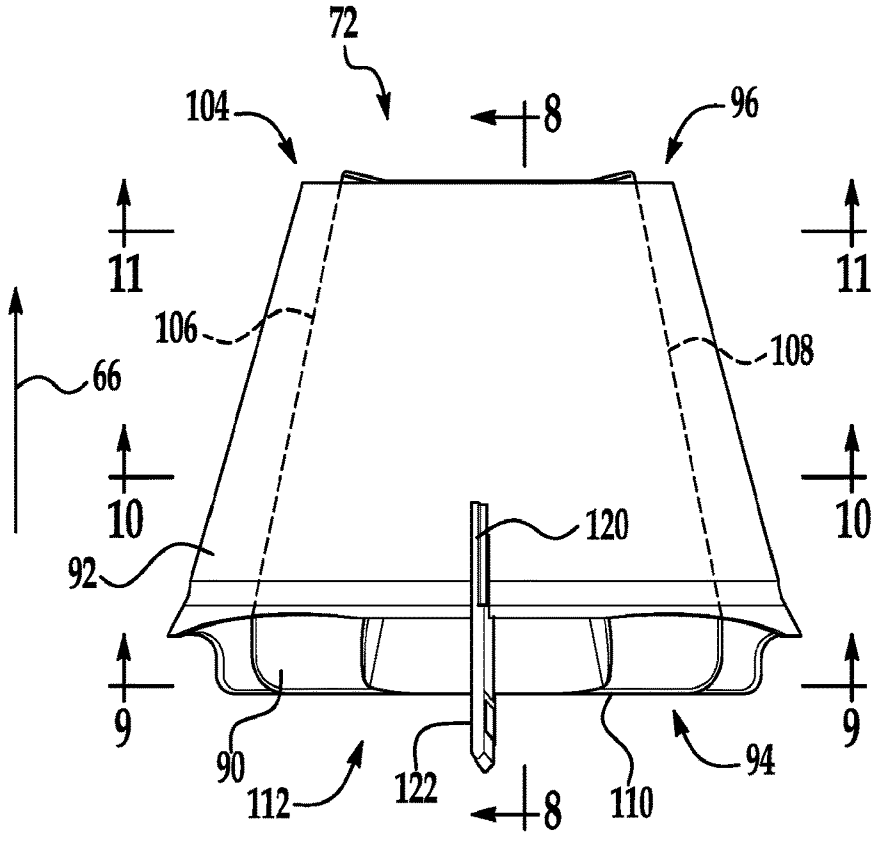
FIG. 7 is a top view of the forming assembly of FIG. 6.
Figure 8:
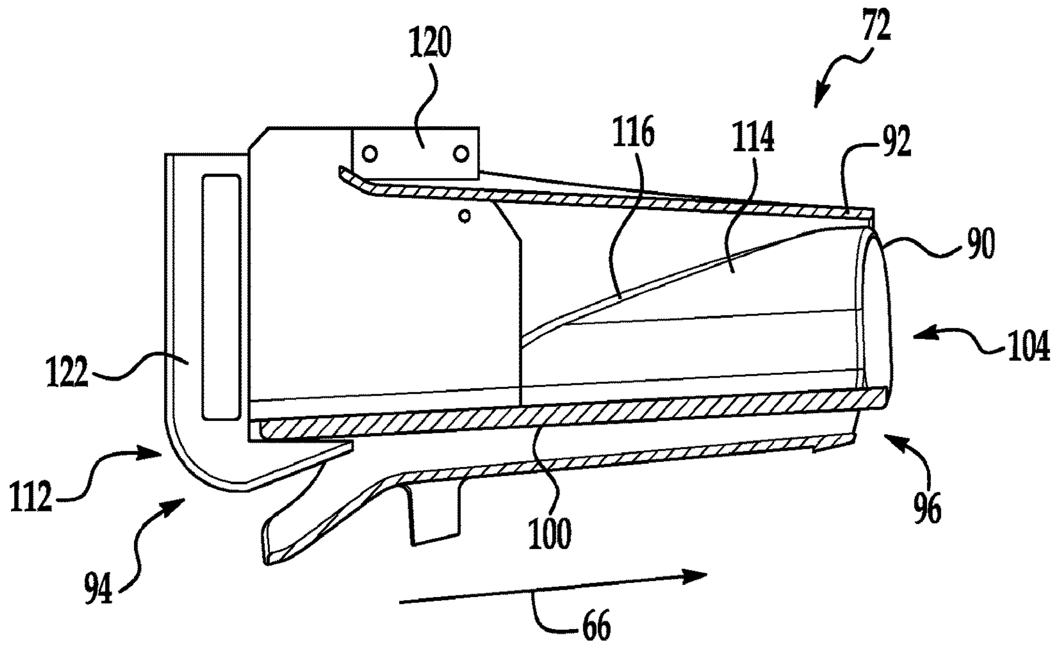
FIG. 8 is a longitudinal cross-section of the forming assembly of FIG. 7, as seen along lines 8-8.

Extending from this bottom surface 100, upwardly in the illustrated orientation of FIG. 6, are a pair of laterally-spaced ramped protrusions 114 that upwardly slope from the upstream end 112 of the former 90 toward the downstream end 104 of the former 90. These ramped protrusions 114 lie on converging axes generally parallel to respective ones of the first and second sides 106 and 108 of the triangular bottom surface 100, and are spaced apart a greater distance at their upstream ends than at their downstream ends. The ramped protrusions 114 generally parallel the long first and second sides 106 and 108 of the triangular bottom surface 100.

The ramped protrusions 114 have a relatively flat upper surface 116 extending from an upstream end adjacent the upstream end 112 of the former 90 in a downstream direction 66, and is spaced an increasing distance from the bottom surface 100 in the downstream direction 66. This flat upper surface 116 may end before the downstream end of the ramped protrusions 114, as in the illustrated embodiment. In the illustrated embodiment the ramped protrusions 114 have a generally round lateral cross-section at the downstream end 104 of the former 90. The ramped protrusions 114 thus appear to have a volume approximating a cylinder that has been sliced on a diagonal to form the flat upper surface 116.

Between the relatively flat upper surface 116 and the bottom surface 100, an outer side of the ramped protrusion 114 may be recessed, which facilitates random crumpling of the sheet stock material 32 into that space as the sheet stock material is drawn over and around the former 90. In the illustrated embodiment the former 90 is supported from above through a mounting bracket 120 secured centrally, between the ramped protrusions 114 and adjacent the upstream end 112 of the former 90.

The illustrated forming assembly 72 further includes a laterally-centered rudder 122 that extends upstream of an upstream end 112 of the former 90 and also extends beyond a bottom surface 100 of the former 90. As the sheet stock material 32 is drawn through the forming assembly 72, the rudder 122 engages a center of the sheet stock material 32 as it enters the forming assembly 72 and redirects a center of the sheet stock material away from the bottom surface 100 of the former 90. This may facilitate crumpling of the sheet stock material in the space between the laterally-outer edges of the former 90 and the rudder 122. The extension of the rudder 122 beyond the bottom surface 100 of the former 90 also may facilitate drawing the lateral edges of the sheet stock material 32 past the central supporting feature of the mounting bracket 120. The illustrated rudder 122 incorporates the mounting bracket 120 and thus also supports the former 90 relative to the external forming device or converging chute 92. A separate bracket 120 may be employed for this purpose in an alternative embodiment.

An alternative forming assembly 124 is shown in FIGS. 12 to 17. In this embodiment, the internal forming device or former 126 has a three-dimensional volume shown in detail in FIGS. 12 to 14. This alternative former 126 is similar to the former 72 shown in FIG. 6, but includes additional features and a different mounting structure. The alternative former 126 includes a similar triangular bottom surface 130 and converging volumes with inclined flat upper surfaces

134 (ramped protrusions 132). Protruding further above the ramped protrusions 132 are a pair of parallel ridges 136, which also may be referred to as shoulders, that extend from an upstream end 140 of the former 126 in a downstream direction. In the illustrated embodiment the shoulders 136 extend less than the full length of the former 126, ending after approximately half the length of the former 126.

In contrast to the rudder 122 that extends upstream of and below the bottom surface of the former, the former 126 shown in this embodiment is mounted through a mounting bracket 142 that connects an upper surface of the former 126 adjacent but downstream of the upstream end 140 of the former 136 to a converging chute or to a portion of the frame or housing of the conversion machine 40. The shoulders 136 are believed to facilitate opening the pre-prepared sheet stock material 32 and guiding free edges of the sheet stock material past the mounting bracket 142 at the upstream end 140 of the former 126, similar to the rudder 122 (FIG. 6), The shoulders 136 further are believed to aid in maintaining a more consistent lateral positioning of the sheet stock material 32, sometimes referred to as tracking, as the sheet stock material 32 moves through the forming assembly 124 from the upstream end 140 to the downstream end 144.

The combination of the converging ramped protrusions 132 and the parallel shoulders 136 are believed to open up and separate the layers 42, and 44 and 46 of the pre-prepared sheet stock material 32 as the sheet stock material is drawn over the former 126, to facilitate random crumpling of the sheet stock material 32 in the process, and to bring the free edges into an overlapping relationship between the ramped protrusions 132 downstream of the mounting bracket 142 and the shoulders 136 to form a crumpled but unconnected strip of cushioning.

Figure 9:
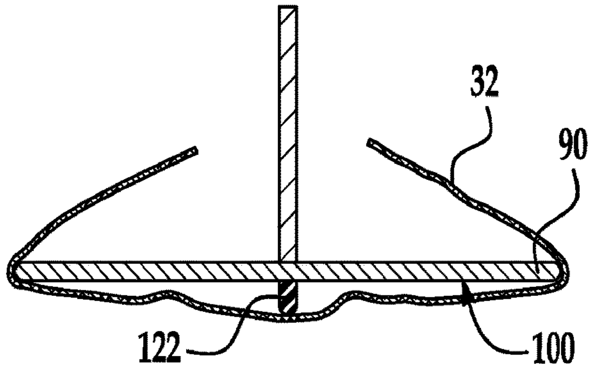
FIG. 9 is a schematic illustration of a sheet stock material at an upstream end of the forming assembly of FIG. 7 as if seen along a cross-section along lines 9-9.
Figure 10:
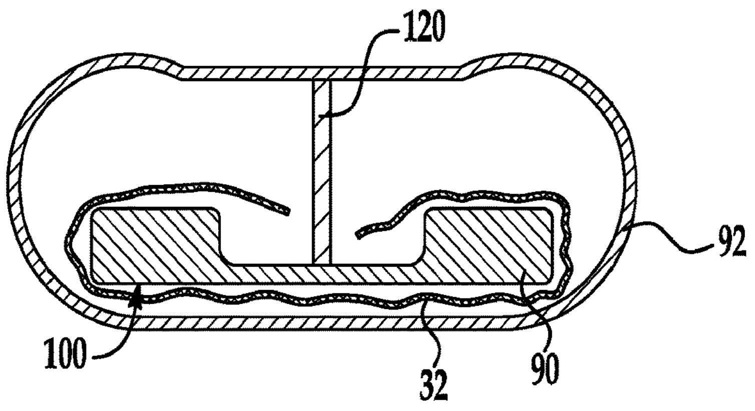
FIG. 10 is a schematic illustration of a sheet stock material at a midpoint of the forming assembly of FIG. 7 as if seen along a cross-section along lines 10-10.
Figure 11:
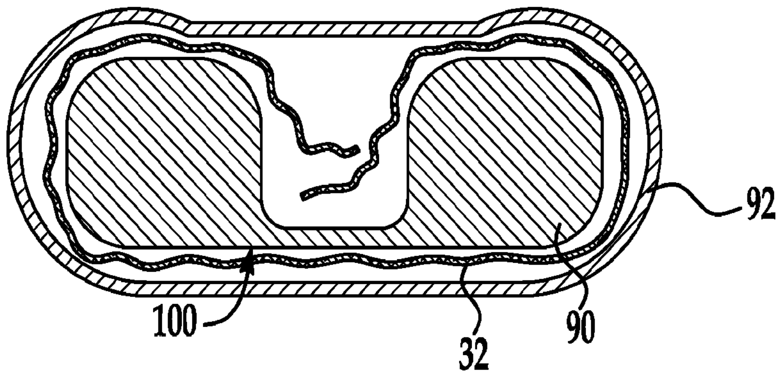
FIG. 11 is a schematic illustration of a sheet stock material at a downstream end of the forming assembly of FIG. 7 as if seen along a cross-section along lines 11-11.
Figure 15:
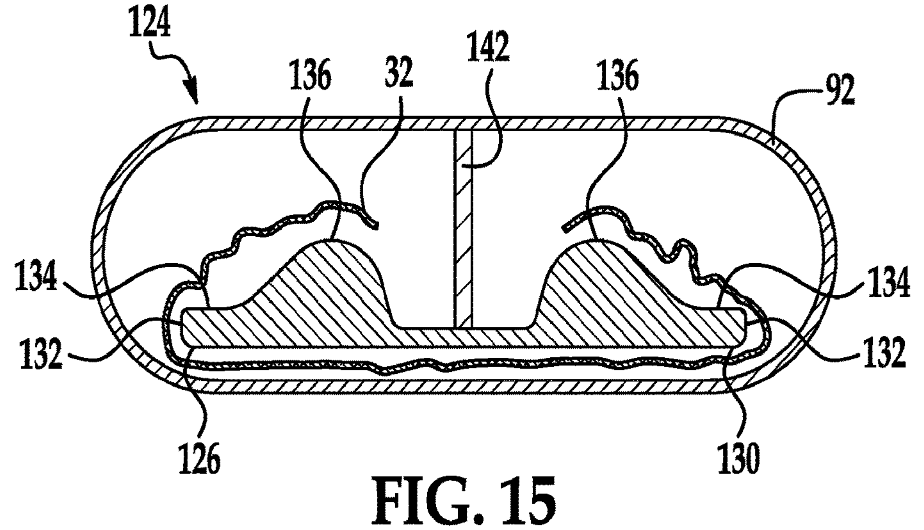
FIG. 15 is a schematic cross-sectional perspective view of the alternative forming assembly of FIG. 12 as seen adjacent an upstream end of the forming assembly.
Figure 16:
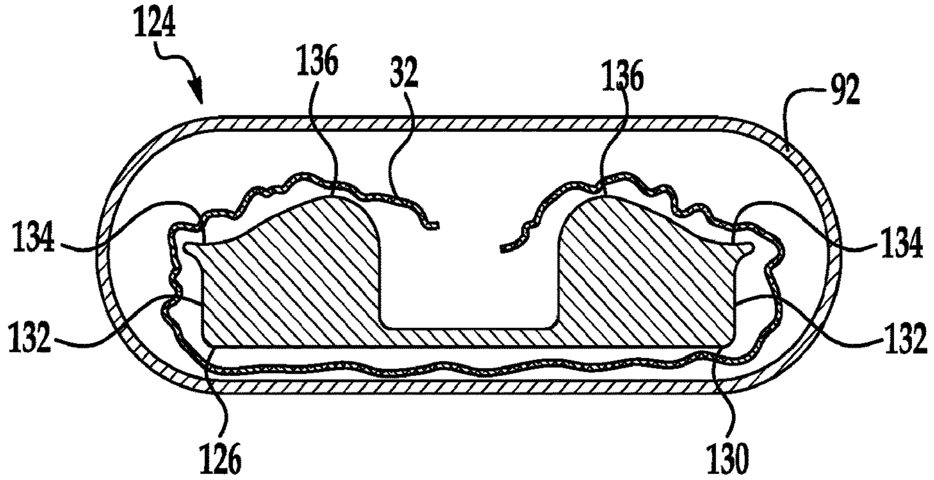
FIG. 16 is a schematic cross-sectional perspective view of the alternative forming assembly of FIG. 12 as seen at a midpoint of the forming assembly.
Figure 17:
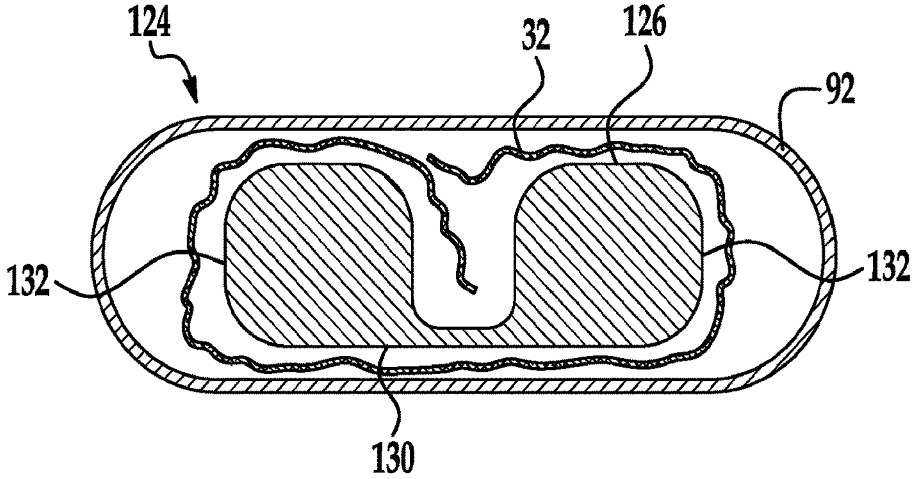
FIG. 17 is a schematic cross-sectional perspective view of the alternative forming assembly of FIG. 12 as seen adjacent a downstream end of the forming assembly.

Schematic cross-sections of the forming assembly 124 at progressive downstream positions through the forming assembly 124 are shown in FIGS. 15 to 17 and illustrate how the sheet stock material 32 may wrap around the former 126 and randomly inwardly crumple as the stock material is drawn through the forming assembly 124 at positions corresponding to those of FIGS. 9 to 11. As shown in FIG. 15, as the sheet stock material 32 enters the external forming device 92 and wraps around the former 126, lateral portions randomly crumple in the space between a top of the ridge 136 and a laterally-outer upper edge of the flat upper surface 134 of the ramped protrusions 132 while a free end of the sheet stock material 32 passes over the ridge 136 and past the mounting bracket 142. A central portion of the sheet stock material 32 passes between the bottom surface 130 of the former 126 and the external forming device 92, but crumpling is minimal in this area as both surfaces are relatively parallel and closely spaced. In FIG. 16, both the external forming device 92 and the former 126 have narrowed, but the central portion of the sheet stock material 32 remains constrained in the narrow gap between the bottom surface 130 of the former 126 and the external forming device 92. The sheet stock material 32 continues to wrap around the ramped protrusions 132 and randomly crumples between the downstream end of the top of the ridge 136 and the laterally-outer upper edge of the flat upper surface 134, and in recessed laterally-outer sides of the ramped protrusions 132. The free edges of the sheet stock material 32 are now past the mounting bracket 142 (FIG. 15) and continue to move inward as the ramped protrusions 132 converge. Adjacent a downstream end 144 (FIG. 14) of the forming assembly 124, the free edges of the sheet stock material begin to overlap in the space between the ramped protrusions 132, as shown in FIG. 17. At this point, the ridges 136 (FIG. 15) and flat upper surfaces 134 (FIG. 15) of the ramped protrusions 132 have ended and the ramped protrusions 132 are each approaching a circular cross-section.

Figure 18:
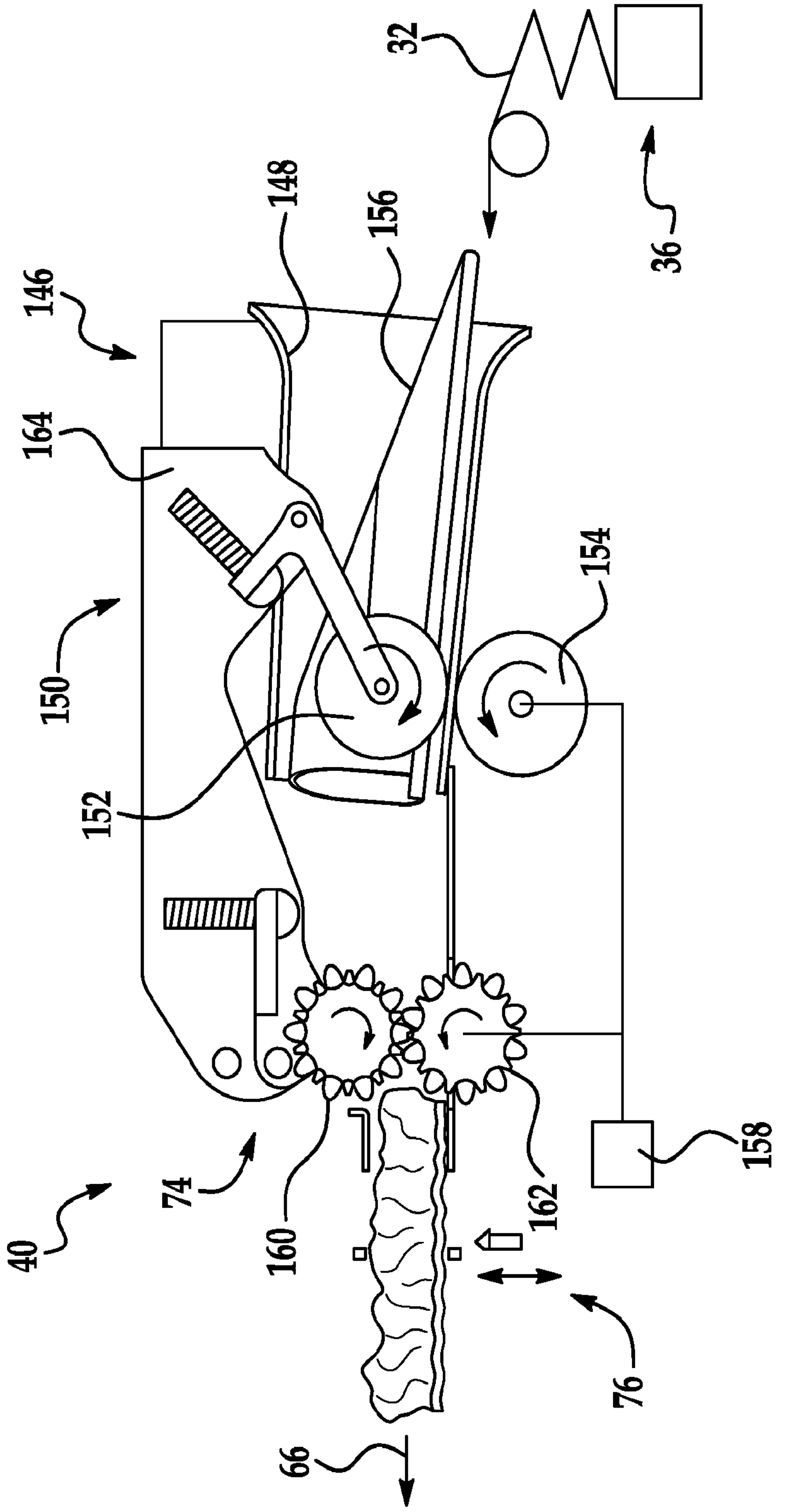
FIG. 18 is a schematic lengthwise cross-section of a dunnage conversion system including another alternative forming assembly.

Turning to FIG. 18, in another forming assembly 146 an external forming device 148 is open on a top side to facilitate passage of an infeed roller assembly 150. The infeed roller assembly 150 includes a pair of pressure rollers 152 and 154, with one of the pressure rollers 154 driven by a motor (not shown) and one of the pressure rollers 152 biased toward the other pressure roller 154 to engage and advance sheet stock material 32 therebetween through the forming assembly 146 to the feeding assembly 74. In the illustrated embodiment the external forming device 148 and the internal forming device 156 each include passages therethrough for the pressure rollers 152 and 154 to meet between the internal forming device 156 and the external forming device 148 (or a guide tray if the external forming device 148 is omitted). The infeed roller assembly 150 facilitates loading sheet stock material 32 into the conversion machine 40.

The pressure rollers 152 and 154 may advance the sheet stock material 32 to the feeding assembly 74 at the same rate as the 4 infeed roller assembly 150 advances the sheet stock material 32 or may further enhance the crumpling of the sheet stock material between the infeed roller assembly 150 and the feeding assembly 74 by being driven at a rate to advance the sheet stock material that is faster than the rate at which the stock material moves through the feeding assembly 74, causing longitudinal crumpling therebetween. The infeed roller assembly 150 and the feeding assembly 74 may be driven by a common controller 158, as shown. The same controller 158 may regulate both the infeed roller assembly 150 and the feeding assembly 74 separately or through a common drive motor (not shown).

The dunnage conversion machine may further include an input device (not show) for communicating with the controller 158. The input device may include a switch, a keyboard or keypad, a pointer, a touch-screen, or any other method of communicating with the controller 158, whether hard-wired or wirelessly. An exemplary capability of the feeding assembly 74 may be provided by a controller 158 that is configured to control the feeding assembly 74 to feed new sheet stock material drawn from the supply (FIG. 1) at a slower rate than the rate at which sheet stock material otherwise is fed through the feeding assembly 74 during conversion of the sheet stock material into a dunnage product. In an exemplary system, the operator inputs a signal to the controller that indicates that a new sheet stock material is being loaded. The controller 158 then operates the feeding assembly 74 to run at a predetermined relatively slower speed. The controller 158 optionally may operate the feeding assembly 74 at that slower speed for a predetermined period of time, or a predetermined maximum period of time. The conversion machine may include a sensor downstream of the feeding assembly, such as at the outlet chute, and the controller may operate the feeding assembly 74 until that sensor detects the presence of the sheet stock material. After this loading operation, the controller 158 may operate at a relatively higher "normal" speed to draw sheet stock material from the supply, through the forming assembly and feeding assembly to form the strip of dunnage.

Additionally, an upper one 152 of the pressure rollers and an upper one 160 of a pair of rotating members of the feeding assembly 74, each of which may be biased toward its opposing lower counterpart 154 and 162, respectively, may be commonly mounted to a frame member 164 that pivots to move those upper members 152 and 160 away from their lower counterparts 154 and 162, respectively. This frame member 164 may be coupled to a wall of the housing 54 (FIG. 1), such that opening the wall of the housing 54 also separates the upper members 152 and 160 away from their lower counterparts 154 and 162, respectively, to facilitate loading fresh sheet stock material, clearing jams, or other maintenance tasks.

Figure 12:
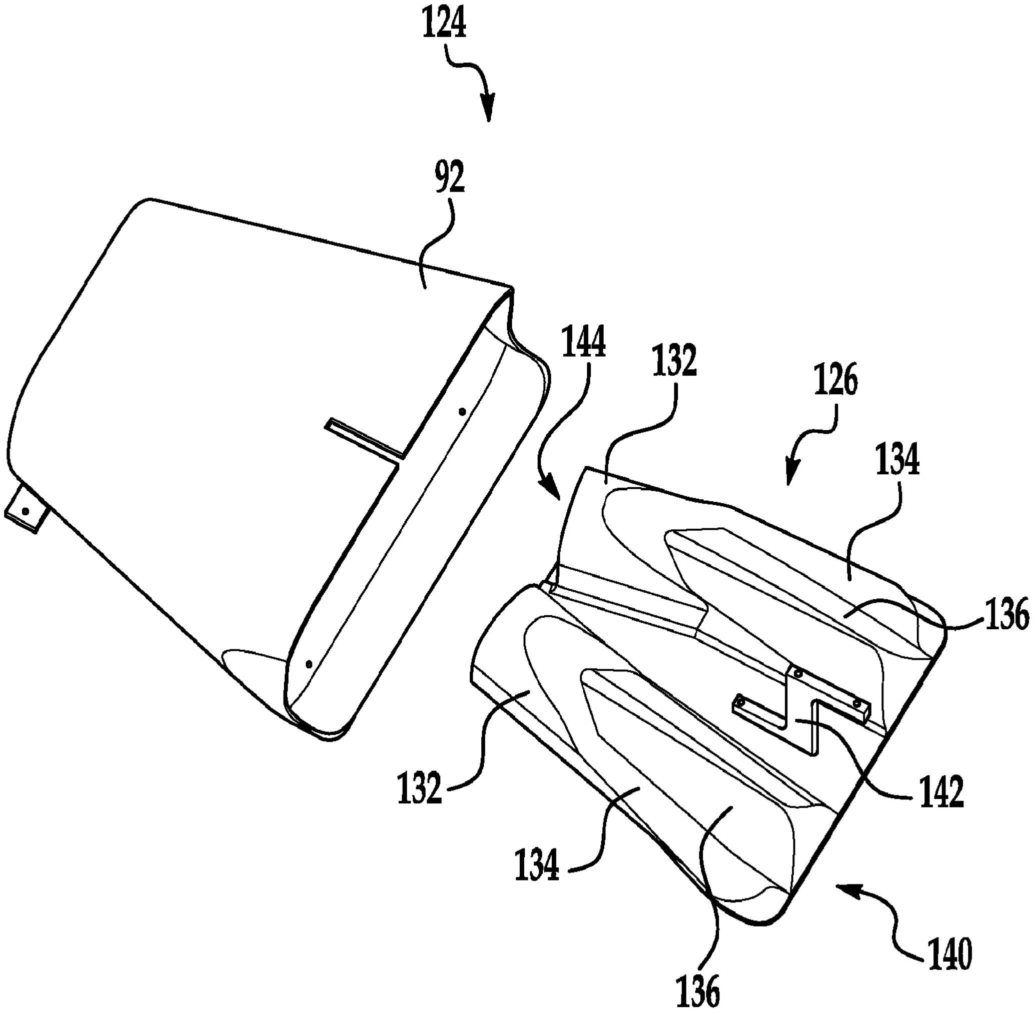
FIG. 12 is an exploded perspective view of an alternative forming assembly provided by the invention.
Figure 13:
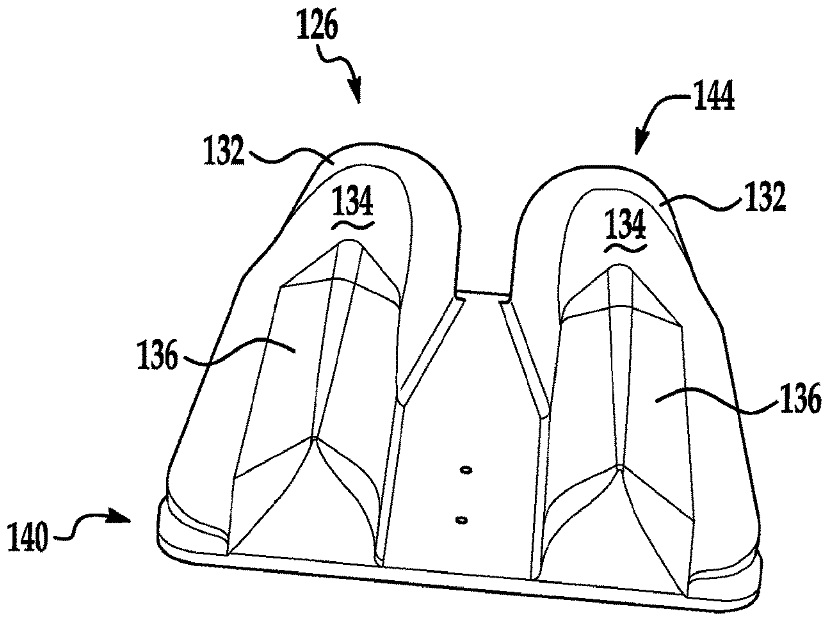
FIG. 13 is a perspective view of an internal forming device of the alternative forming assembly of FIG. 12.
Figure 14:
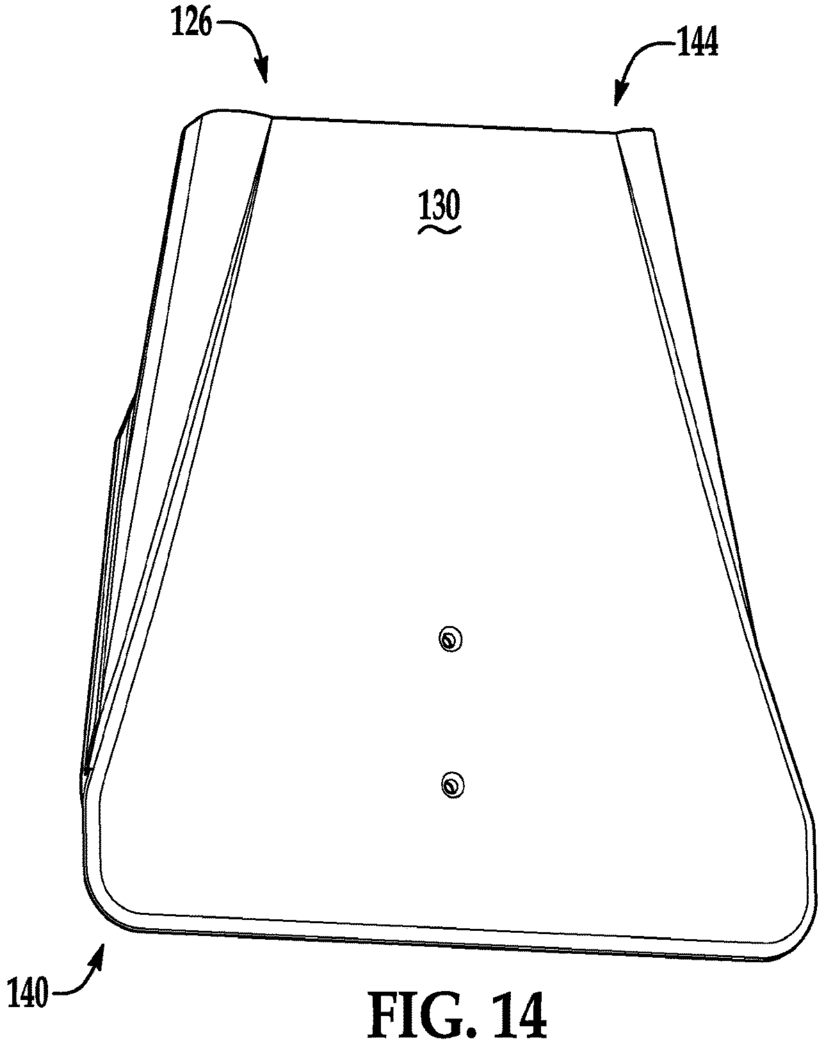
FIG. 14 is a bottom view of the internal forming device of FIG. 13.
Figure 19:
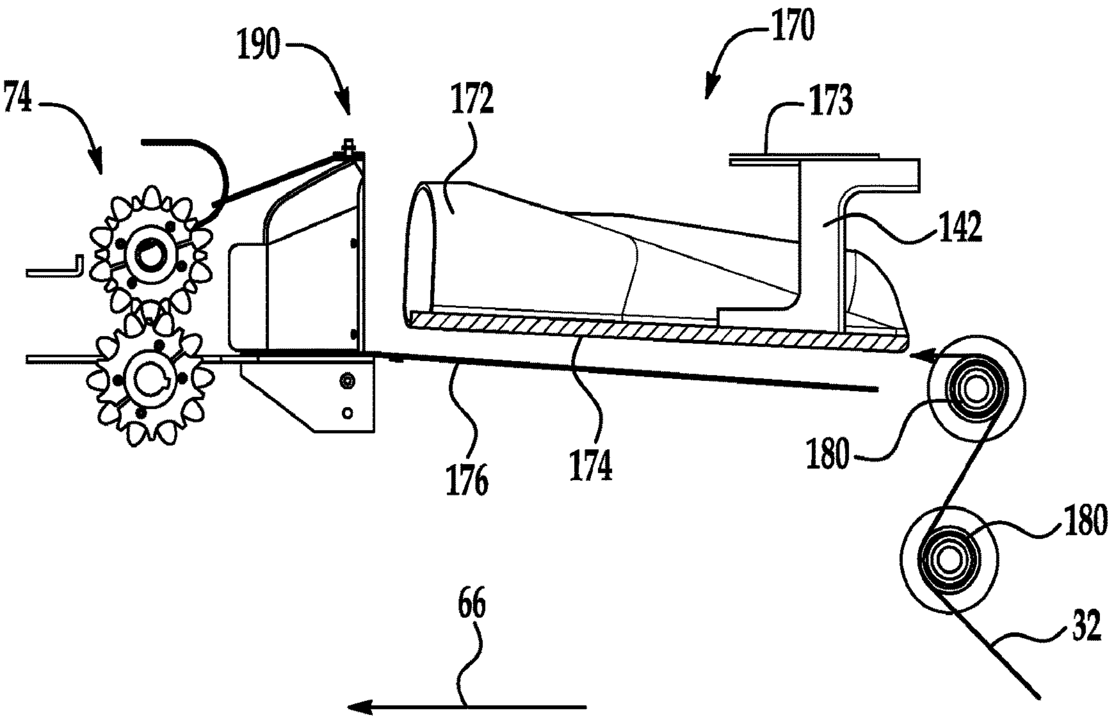
FIG. 19 is a schematic lengthwise cross-section of a portion of a dunnage conversion machine with a forming assembly that includes the internal forming device of FIG. 13; a feeding assembly; and a set of guide walls between the forming assembly and the feeding assembly.

A longitudinal cross-section of yet another forming assembly 170 along a downstream direction 66 is shown in FIG. 19. In this forming assembly 170, the external forming device is omitted, and the internal forming device 172, which is similar to the internal forming device 126 of FIG. 12, is supported by a portion of the frame 173 and the mounting bracket 142. Thus, a central portion of the sheet stock material 32 travels between a bottom surface 174 of the internal forming device 172 and a guide plate 176 spaced from the bottom surface 174 of the internal forming device 172. The guide plate 176 alternatively may be referred to as a guide tray. The sheet stock material 32 is drawn from a supply (not shown), over a series of rollers 180 that facilitate maintaining a consistent tension in the sheet stock material 32 and that provide a constant entry point for the sheet stock material into the forming assembly 170 as the volume of sheet stock material in the supply changes.

In use, the stock material 32 travels through the external forming device 292 and around the internal forming device 90 as it passes through the forming assembly 72 to form the unconnected strip of randomly crumpled stock material. A central portion of the stock material 32 travels between a bottom surface 100 of the internal forming device 90 and an inner surface of the external forming device 92 as shown, or in the absence of the external forming device 92, between the bottom surface 100 of the internal forming device 90 and a guide plate 176 (FIG. 19) spaced from and approximately parallel to the bottom surface 100 of the internal forming device 72 (corresponding to bottom surface 174 in FIG. 19).

A set of feeding assembly guides 190 cooperate with the guide tray 192 to guide the crumpled strip of cushioning from the forming assembly 170 to the feeding assembly 74.

Feeding Assembly Guides

Figure 20:
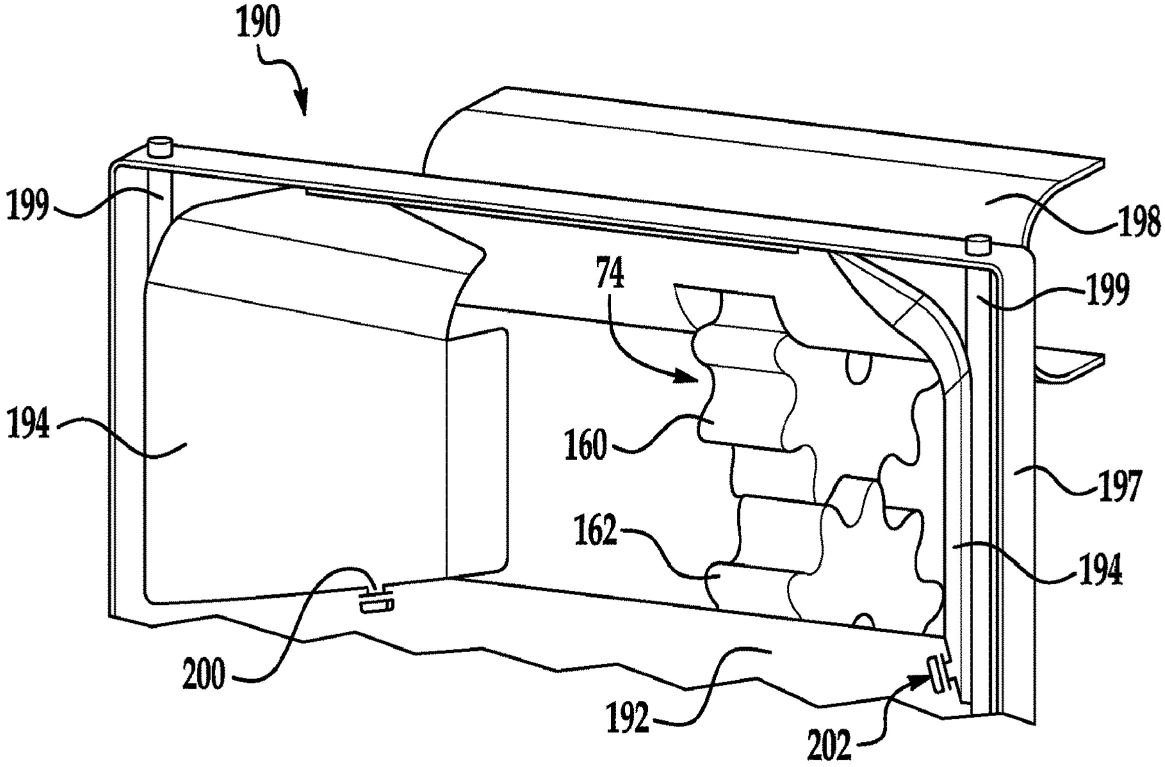
FIG. 20 is a schematic perspective view of the set of guide walls and the feeding assembly of FIG. 19.
Figure 21:
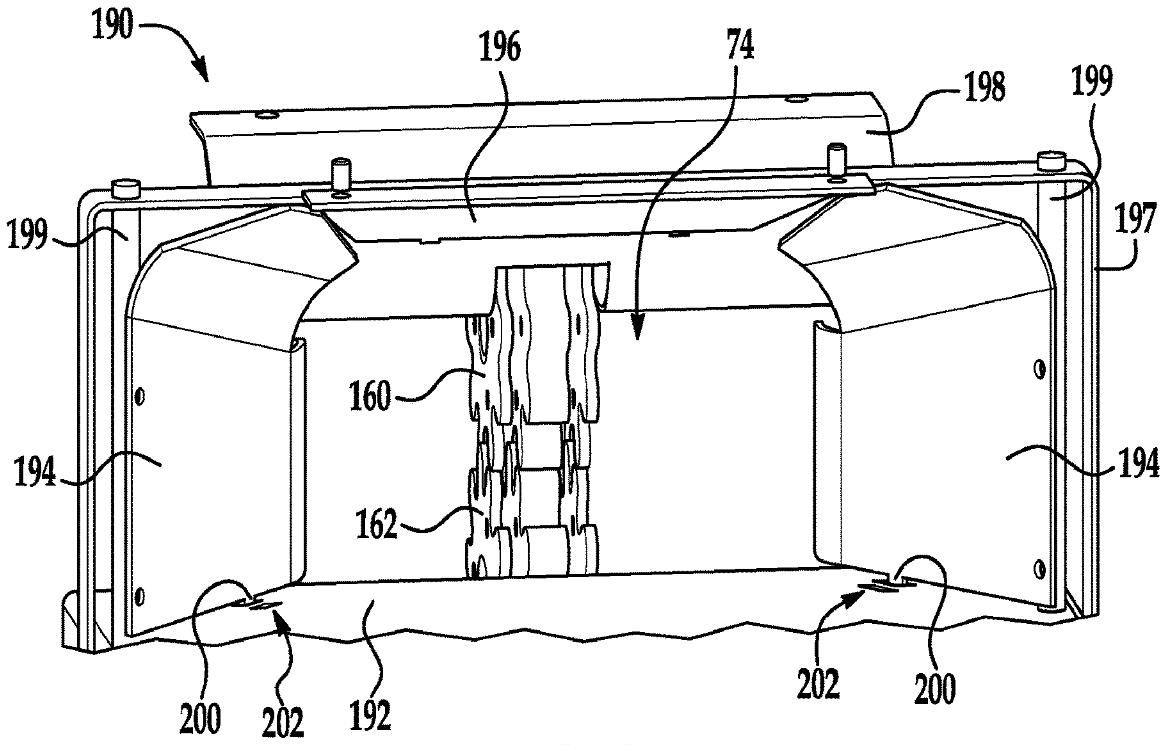
FIG. 21 is another schematic perspective view of the set of guide walls and the feeding assembly of FIG. 19.
Figure 22:
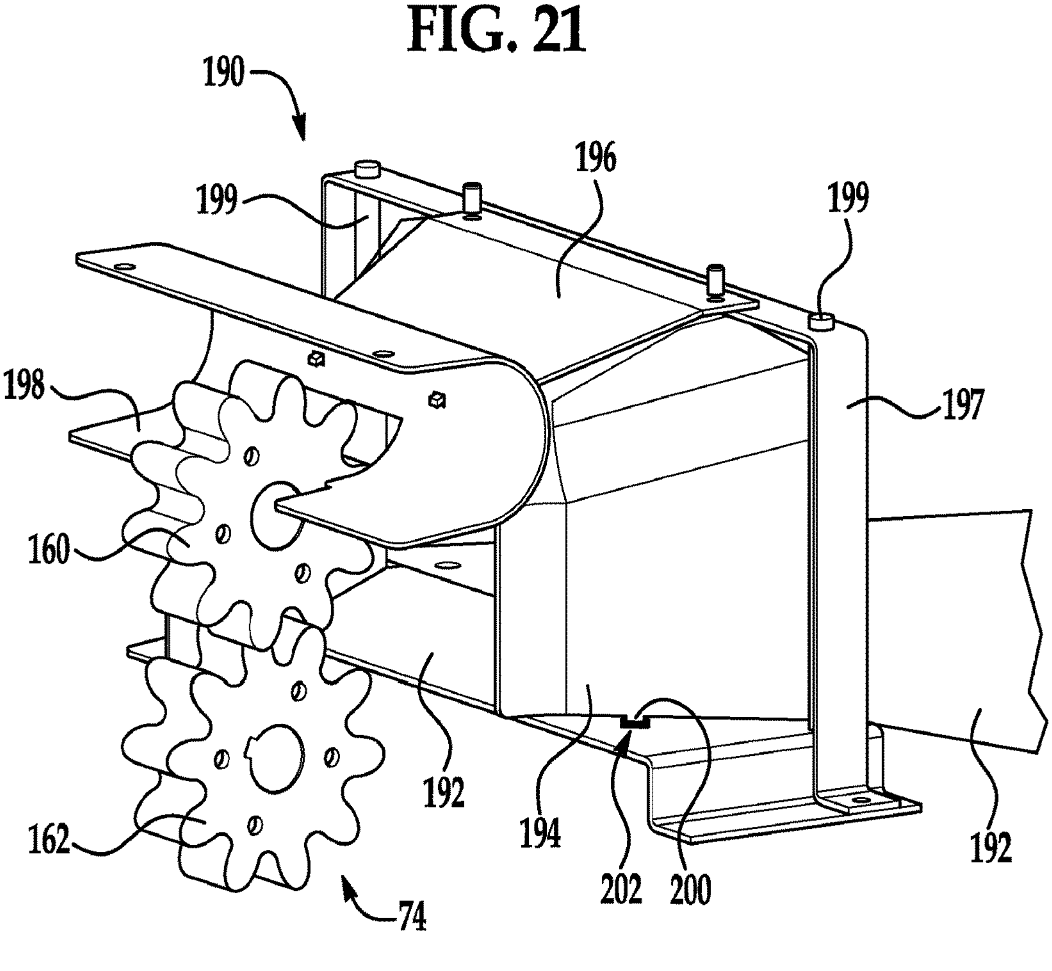
FIG. 22 is a schematic perspective view of the set of guide walls and the feeding assembly of FIG. 19, as seen from an opposite side of the set of guide walls in comparison to FIG. 21.

To facilitate guiding the unconnected but crumpled strip of cushioning from the forming assembly 72 to the feeding assembly 74, the conversion machine 40 further includes a set of adjustable feeding assembly guides 190. Referring now to FIGS. 20 to 22, the feeding assembly guides 190 cooperate with the guide tray 192 to circumferentially constrain the path of the sheet stock material from the forming assembly 72 downstream to the feeding assembly 74. In particular, lateral guide panels 194 of the set of feeding assembly guides 190 are mountable in a plurality of positions to adjust the width of the path, and thus the width of the unconnected strip of cushioning dunnage before the feeding assembly 74 connects the overlapping layers of sheet stock material in the strip of cushioning.

In the illustrated embodiment, the feeding assembly guides 190 include an upper guide member 196 and laterally-spaced lateral guide panels 194. The upper guide member 196 is shown mounted between a frame member 197 and a curved guide member 198 that deflects the sheet stock material from a shaft (not shown) of an upper rotating member 160 of the feeding assembly 74. The lateral guide panels 194, also referred to as side guide members, may be outwardly curved, as shown, to facilitate gradual engagement and disengagement with the unconnected strip of dunnage. The side guide members 194 curve outwardly at their respective downstream ends adjacent the feeding assembly 74. An upstream end of each of the side guide members 194 is pivotally mounted to respective swivel rods 199 for rotation about an axis generally perpendicular to the surface of the guide tray 192, upward or vertically in the illustrated orientation. Each side guide member 194 includes one or more locating protrusions 200 spaced downstream from the upstream end of the side guide member 194 arranged to engage one of a plurality of cooperating recesses 202 in the guide tray 192, thereby providing a way to position the side guide members 194 in any of a plurality of predetermined relatively-rotated positions. Alternative means for adjustably positioning the side guide members 194 in a plurality of predetermined positions may be employed. The side guide members 194 preferably are symmetrically arranged relative to a center line of the path of the sheet stock material from the forming assembly 72 to the feeding assembly 74, but each side guide member 194 is adjustable to provide relatively wider and relatively narrower paths through the set of forming assembly guides 190 to limit a maximum width of the unconnected strip passing through to the feeding assembly 74. This changes the width of the resulting pad, in other words, the width of the resulting cushioning product.

Feeding Assembly

As mentioned above, the feeding assembly 74 shown in FIGS. 21 and 22 includes a pair of rotating members 160 and 162 between which the sheet stock material 32 travels, the rotating members 160 and 162 cooperating to pull the sheet stock material 32 from the supply 36 and through the forming assembly 72 (FIG. 1) or 170 (FIG. 19) to the nip between the rotating members 160 and 162.

In an exemplary feeding assembly 74, the rotating feed members 160 and 162 have a plurality of radially outwardly-extending projections or teeth around a circumference that facilitate driving engagement between a driven rotating feed member 162 and an idler rotating feed member 160. The driven rotating feed member 162 is connected to a motor (not shown), such as through a chain or belt and one or more gears to adjust the speed of the feed members 160 and 162. Because of the engagement between the teeth of the driven rotating member 162 and the idler rotating member 160, the driven and idler rotating feed members 162 and 160 may be referred to as driven and idler gears, respectively.

In the illustrated embodiment the driven gear 162 projects through a rectangular slot in the guide tray 192. The idler gear 160 is positioned on the opposite side of the guide tray 192 and is supported for rotation in response to rotation of the driven gear 162. The idler gear 160 is biased toward the driven gear 162 and is mounted to "float" relative to the drive gear 162 thereby creating an automatic adjustment system for the feeding assembly 74.

In one or both of the driven and idler gears 162 and 160, the teeth may have axially-spaced segments that define a recess therebetween. Axially-opposite the recess, the other gear or gears may have a plurality of axial punch segments which each include a peripheral edge portion for receipt into the opposing gear's recesses. The peripheral edge portions would have opposite corners which are cooperative with the opposing gear's teeth that define the recess to cut a row of periodic parallel slits in overlapped portions of the stock material passing between the driven and idler gears to interlock these overlapped portions. The axial punch segments not only cooperate to cut the slits, but also push the sheet material between the slits in a direction perpendicular to the sheet material and teeth of the opposing gear will push the sheet material outwardly adjacent the slits in an opposite direction to form a tab between the slits that is displaced from the plane of the sheet stock material to interconnect and interlock the layers of sheet material adjacent the slits Thus, the feeding assembly gears 160 and 162 include a drive gear 162 and an idler gear 160 driven by the drive gear 162. As the gears 160 and 162 turn, the gears grab a central band of the strip and pull the sheet material downstream through the nip of the gears 160 and 162. This same "grabbing" motion caused by the meshing teeth on the opposed gears simultaneously compresses or "coins" the layers of the central band together and cuts and stitches the layers of sheet material in the central band, thereby connecting the same and forming the connected strip. The connected strip is then cut or otherwise severed by the severing assembly 76 into discrete sections or cushioning products 34 (FIG. 1) of the desired length.

Severing Assembly

Figure 23:
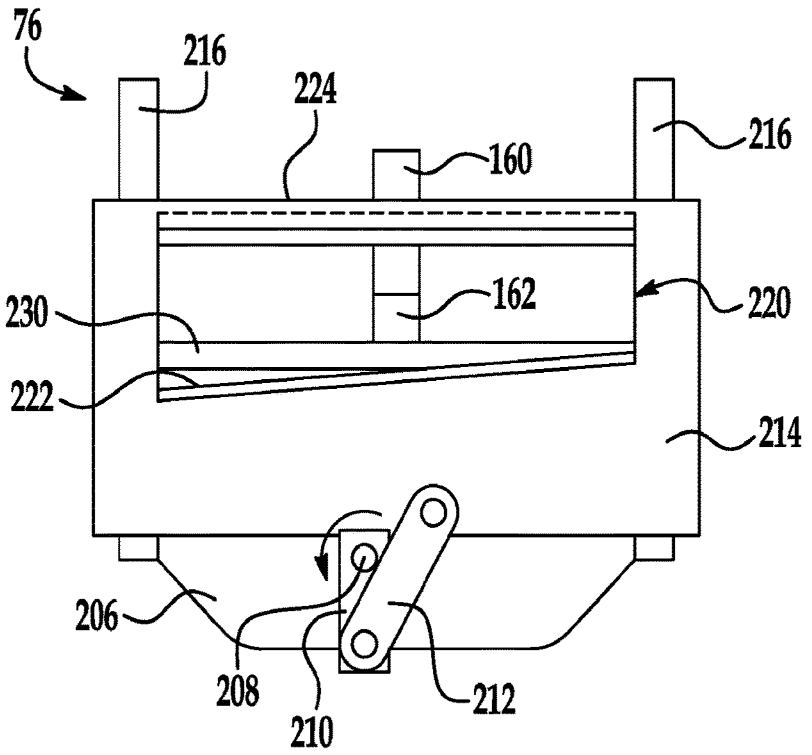
FIG. 23 is a schematic elevation view of a severing assembly provided by the present invention in a feeding position.
Figure 24:
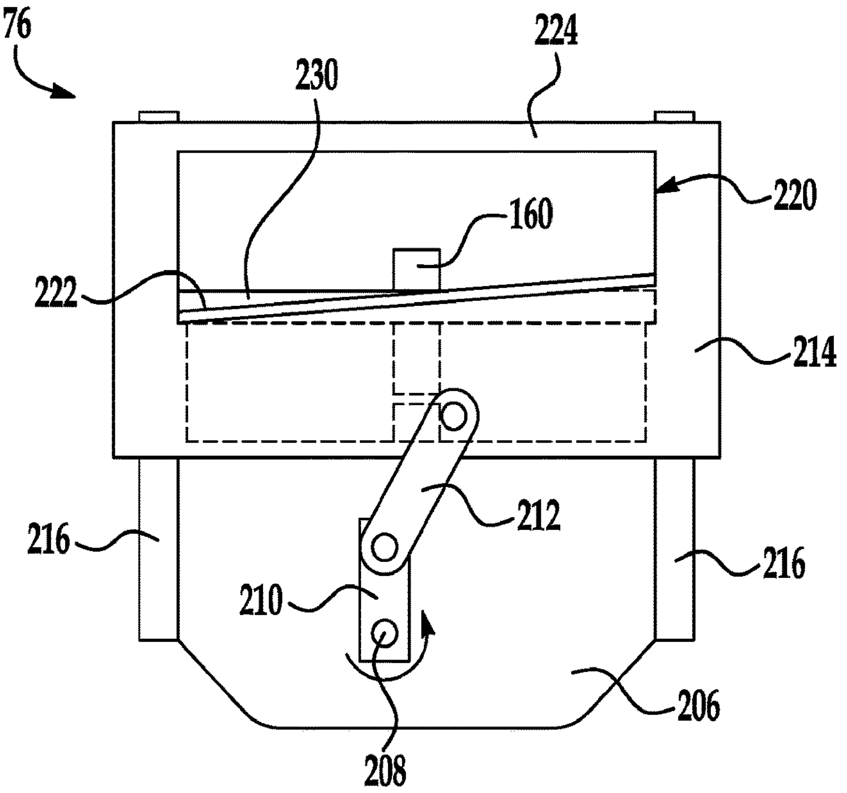
FIG. 24 is a schematic elevation view of a severing assembly provided by the present invention in a severing position.
Figure 25:
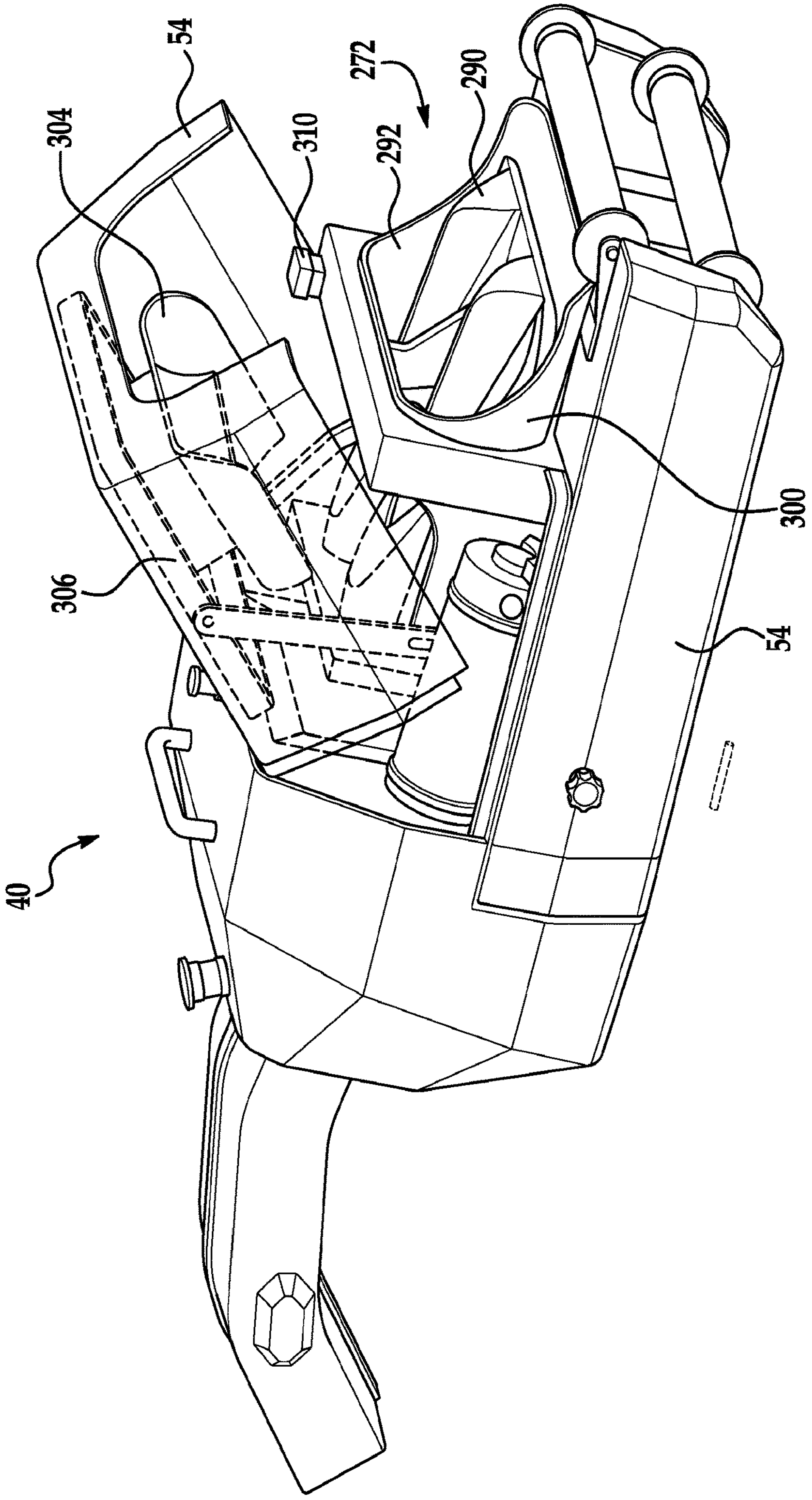
FIG. 25 is a perspective view of a dunnage conversion machine with an alternative forming assembly with a partially open housing.
Figure 26:
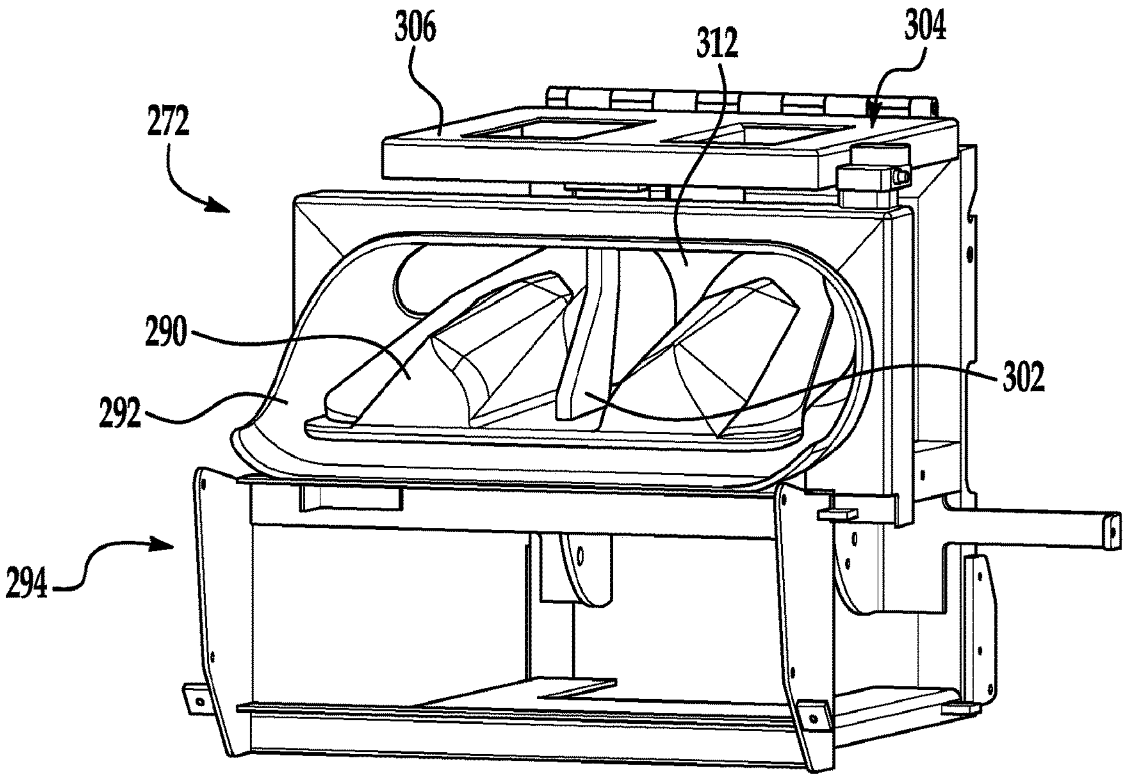
FIG. 26 is a rear perspective view of the alternative forming assembly of FIG. 25 isolated from the housing.
Figure 27:
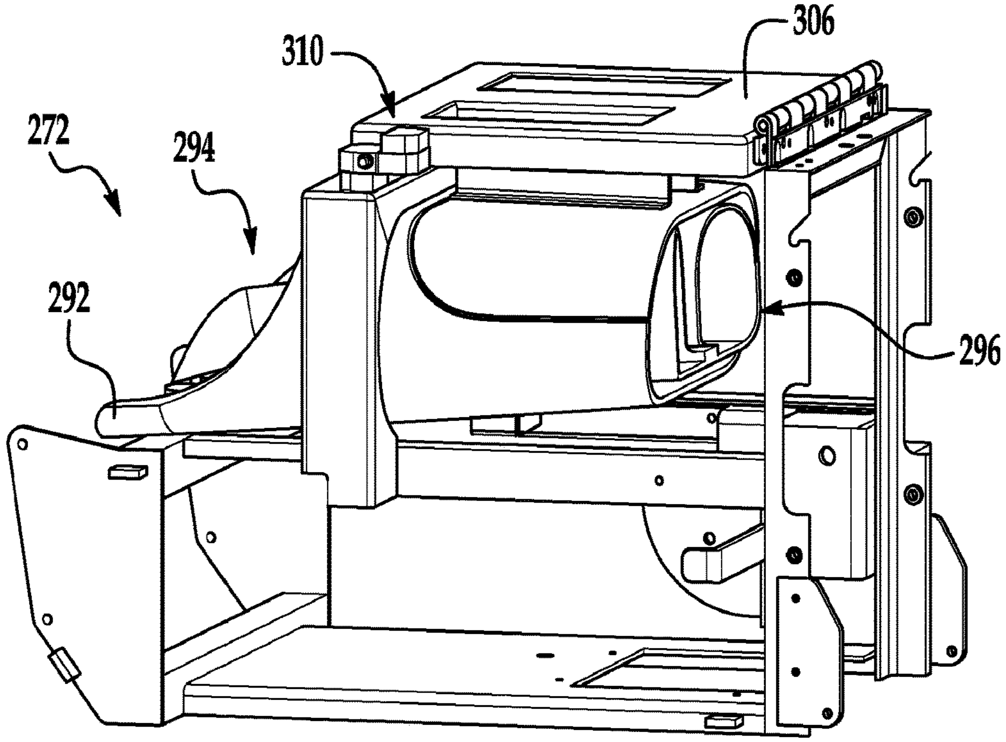
FIG. 27 is a side perspective view of the alternative forming assembly of FIG. 26.
Figure 28:
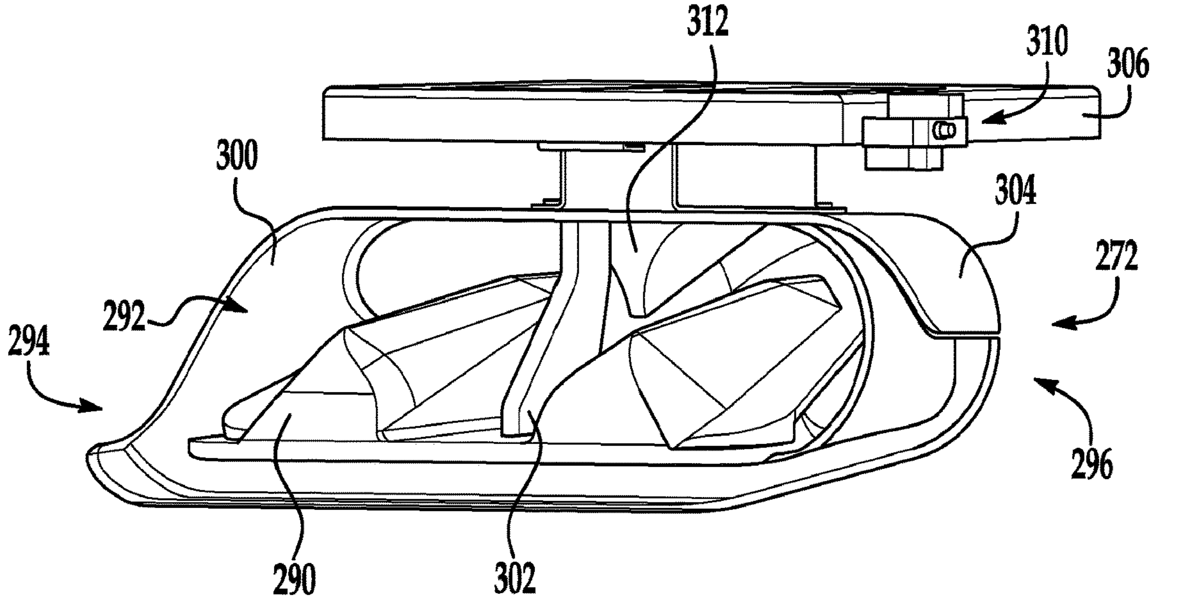
FIG. 28 is an enlarged rear perspective view of the alternative forming assembly of FIG. 26.
Figure 29:
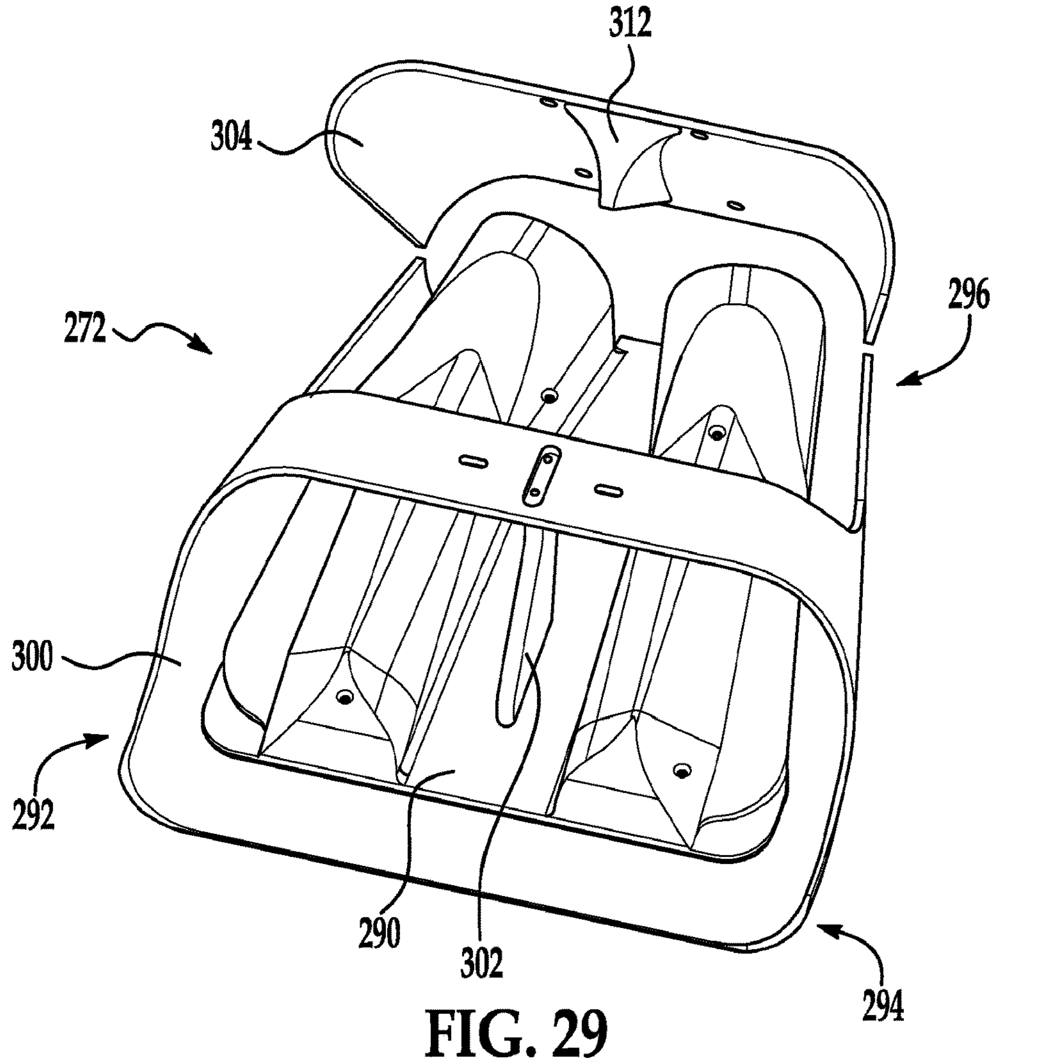
FIG. 29 is an enlarged rear perspective view of the alternative forming assembly of FIG. 26 partially open.

Referring now to FIGS. 23 and 24, the conversion machine 40 further may include elements, such as an extension of the guide tray 192 downstream from the feeding assembly 74, that form a tunnel that constrains the path of the connected strip of cushioning and guides the connected strip from the feeding assembly 74 to the severing assembly 76. The frame of the conversion machine 40 includes an end plate 206 to which the components of the severing assembly 76 are mounted. A motor (not shown) is mounted to an upstream side of the end plate 206 and a drive shaft 208 from the motor is connected to and drives a crank 210 on a downstream side of the end plate 206. The crank 210 is connected to a link 212 that connects the crank 210 to a drive plate 214. The drive plate 214 also is coupled to the end plate 206 through a pair of parallel guides 216 that form a track for guiding movement of the drive plate 214. The drive plate 214 is movable relative to the end plate 206 and to the parallel guides 216. As the crank 210 rotates, the drive plate 214 slides along the parallel guides 216, which guide the movement of the drive plate 214 as it translates between a feeding position (FIG. 23) that permits the passage of the connected strip and a severing position (FIG. 24) removed from the feeding position.

The drive plate 214 has an upstream side and a downstream side and includes a window frame passage 220 from the upstream side to the downstream side through which the connected strip of dunnage passes when the drive plate 214 is in the feeding position (FIG. 23). The passage 220 typically has a generally rectangular shape and functions as a continuation of the tunnel from the feeding assembly 74. A cutting blade 222 movable with the drive plate 214 is mounted to one side thereof—the upstream side in the illustrated embodiment. The drive plate 214 lies in a plane perpendicular to the path of travel of the connected strip and is movable parallel to that plane to move the cutting blade 222 across the path of travel to sever discrete dunnage products of a desired length from the connected strip. In the severing position (FIG. 24), the drive plate 214 blocks the path of the sheet stock material, thereby preventing the connected strip of cushioning from extending into the path of the movable cutting blade 222 as the drive plate 214 returns to the feeding position. Similarly, a distal or top side of the passage 220 through the drive plate 214 forms a crossbar 224, and if the downstream end of the connected strip of cushioning or the upstream end of the severed cushioning product are pulled out of alignment with the path from the feeding assembly 74 to the outlet chute 78, the crossbar 224 pulls the connected strip and the dunnage product back into alignment along the path of the sheet stock material from the feeding assembly 74 upstream of the severing assembly 76 to the outlet chute 78 downstream of the severing assembly 76.

The movable cutting blade 222, is mounted to the upstream side of the drive plate 214 for movement between the feeding position and the severing position. In the feeding position shown in FIG. 23, the strip of cushioning may pass through the passage 220 in the drive plate 214 to the outlet chute 78. As the drive plate 214 moves to its severing position (shown in FIG. 24), the movable blade 222 cooperates with a stationary blade 230 mounted to a facing surface of the end plate 206 to sever a discrete length of cushioning from the connected strip of cushioning.

The movable blade 222 is mounted at a non-perpendicular angle transverse the direction of motion of the drive plate 214, and the stationary blade 230 is mounted perpendicular to the direction of motion of the drive plate 214, at an acute angle relative to the movable blade 222, whereby a contact point between the stationary blade 230 and the movable blade 222 traverses the path of the connected strip of cushioning as the drive plate 214 moves from the feeding position to the severing position.

Accordingly, in operation the motor drives rotation of the drive shaft 208 and imparts a circular motion to the crank 210. The crank 210 is fixed relative to the drive shaft 208 and rotates with the drive shaft 208. One end of the link 212 is coupled to the crank 210 and rotates relative to the crank 210 as the crank rotates. An opposite end of the link 212 is coupled to the drive plate 214 and rotates relative to the drive plate 214 as the drive plate 214 is guided by the parallel guides 216 to translate between the feeding position and the severing position. In the process, the movable cutting blade 222 engages the stationary cutting blade 230 to cut the strip of dunnage. And as the drive plate 214 returns to the feeding position, the crossbar 224 of the passage 220 through the drive plate 214 ensures that the cut ends of the strip of dunnage are again aligned with the path between the feeding assembly 74 and the outlet chute 78. Thus the severing assembly 76 provided by the present invention is made of relatively few and simple components, making the manufacturing, assembly and adjusting thereof relatively simple.

To put it another way, the movable cutting blade 222 is mounted to drive plate 214, which includes the crossbar 224 that forms the top of the passage 220. When the feeding assembly 74 feeds the strip of dunnage through the passage 220, the drive plate 214 is in the feeding position with both the movable blade 222 and the stationary blade 230 near the bottom of the passage 220. During the cut cycle, the drive plate 214 moves upward, moving the movable cutting blade 222 upward and across the stationary blade 230 cutting a discrete pad on a downstream side from the strip of dunnage on the upstream side. This upward motion also pushes a leading edge of the strip of dunnage and a trialing edge of the cut cushioning pad upward with the passage 220. As the drive plate 214 retracts to the feeding position once again, the crossbar 224 moves down with it, pulling the cut edges of the strip of dunnage and the cushioning pad down and in a position aligned with the outlet chute. The strip of dunnage and the cushioning pad are then in position to feed out of the chute during the next feed cycle. The benefit of the crossbar 224 is that the uncut strip of cushioning in the conversion machine is brought in line with the cut pad in the chute so that the pad in the outlet chute can be pushed out during the next feed cycle. This reduces the chances of the pads shingling over one another causing a jam in the chute.

Alternative Forming Assembly

In addition to or as an alternative to other parts of the conversion machine 40 described above, the conversion machine 40 may include an alternative forming assembly

272, as shown in FIGS. 25 to 29. The alternative forming assembly 272 includes an internal forming device 290, similar to the former 90 described above, and an alternative external forming device 292 in place of the external forming device 92 shown in FIG. 12.

The alternative external forming device 292 converges from a relatively larger inlet 294 at an upstream end to a relatively smaller outlet 296 at a downstream end to form a converging chute. Unlike the external forming device 92, the alternative external forming device 292 has two parts that can move relative to one another. A main portion 300 of the alternative external forming device 292 is mounted to the frame of the conversion machine 40 in the same manner as the external forming device 92. The internal forming device 290 is mounted to and supported from an upper side of the main portion 300 of the alternative external forming device 292 toward an upstream end, adjacent the inlet 294 by a support arm 302. At the top of the alternative external forming device 292, toward a downstream end adjacent the outlet 296, the alternative external forming device 292 has a movable portion 304 that is movable relative to the main portion 300. Typically, the movable portion 304 is mounted to a hinged element 306 of the frame to which a portion of the housing 54 of the conversion machine 40 is attached. As a result, when the housing 54 is opened in the usual manner to access internal components of the conversion machine 40 for maintenance, for example, the movable portion 304 of the alternative external forming device 292 moves with the housing 54, and moves away from the main portion 300 of the alternative external forming device 292, providing a passage into an interior of the alternative external forming device 292 and the internal forming device 290. This may be useful in loading a leading end of a new supply of sheet stock material into the alternative forming assembly 272, for clearing jams, etc.

The alternative forming assembly 272 may further include one or more sensors, such as the illustrated proximity sensor 310, configured to detect movement of the movable portion 304 of the alternative external forming device 292. The output of such a sensor 310 may be provided to a controller (not shown) that can output a signal to control the feeding assembly 74 and/or the severing assembly 76 (FIG. 1) based on the signal from the sensor 310. For example, if a foreign object enters the alternative external forming device 292 or a jam of sheet stock material occurs such that the movable portion 304 of the alternative external forming device 292 moves sufficiently to cause the sensor 310 to detect such movement, the sensor 310 will output a signal to the controller to indicate a fault condition and the controller may be configured to prevent the feeding assembly 74 and/or the severing assembly 76 from operating until the fault condition is resolved. In other words, the controller may stop all of the moving components until the movable portion 304 of the alternative external forming device 292 is returned to its original position. Opening the housing 54, which also removes the movable portion 304 from the alternative external forming device 292, facilitates resolving whatever issues caused the fault condition quickly and returning the feeding assembly 74 and the severing assembly 76 to ready-to-operate condition.

The external forming device 292 may further include a forming wedge 312 that protrudes from the movable portion 304 into the alternative external forming device 292, toward the internal forming device 290, to further facilitate the formation of the strip of dunnage toward the downstream end 296 of the alternative forming assembly 272. The forming wedge 312 decreases in lateral width and extent of protrusion from an upstream end adjacent the support arm 302 for the internal forming device 290 toward a downstream end 296 of the alternative forming assembly 272. The forming wedge 312 thus diverts sheet stock material from a central portion of the alternative forming assembly 272 but exerts decreasing influence as the sheet stock material advances in a downstream direction.

In use the alternative forming assembly 272 generally functions the same way as the forming assembly 72 described above, with the additional influence of the forming wedge 312 engaging any portions of the sheet stock material as it moves downstream through the alternative forming assembly 272. Advantageously, however, the external forming device 292 can be opened to access the downstream end of the alternative forming assembly 272 to clear jams, facilitate loading sheet stock material through the alternative forming assembly 272, etc.

In summary, the present invention provides a cushioning conversion machine 40 that converts a sheet stock material 32 into a relatively lower-density cushioning product 34. An exemplary sheet stock material 32 includes two sheets 44 and 46 that each overlap another sheet 42 and are connected to respective lateral edges of the other sheet 42. The conversion machine 40 includes a forming assembly 72 having a former 90 for shaping and randomly crumpling the sheet material, a set of adjustable guide members 190 to guide the crumpled sheet material to a feeding assembly 74 downstream of the forming assembly 72, and a severing assembly 76 downstream of the feeding assembly 74 that separates discrete lengths of cushioning. The severing assembly 76 includes a window frame passage 222 that guides the crumpled sheet material to an outlet 62 during operation of the feeding assembly 74 and constrains the crumpled sheet stock material during operation of the severing assembly 76.

Although the invention has been shown and described with respect to a certain embodiment, equivalent alterations and modifications will occur to others skilled in the art upon the reading and understanding of this specification. The present invention includes all such equivalent alterations and modifications, and is limited only by the scope of the following claims. Furthermore, the corresponding structures, materials, acts, and equivalents of all means or step plus function elements in the claims below are intended to include any structure, material, or acts for performing the functions in combination with other claimed elements as specifically claimed.

We claim:

1. A forming assembly for a cushioning conversion machine, comprising:

an internal forming device having a height dimension, a width dimension perpendicular to the height dimension, and a length dimension perpendicular to both the height dimension and the width dimension, a bottom surface, and a pair of laterally-spaced lengthwise-extending protrusions that protrude from a common side of the bottom surface, where the width dimension decreases from an upstream end to a downstream end spaced from the upstream end along the length dimension, and the height dimension of the protrusions increases from the upstream end to the downstream end such that the protrusions include wedge-shape volumes, where the wedge-shape volumes of the protrusions extend along converging axes, and the protrusions include a pair of laterally-spaced lengthwise-extending parallel ridges that are coextensive with and protrude above the wedge-shape volumes and are spaced inwardly from laterally-outer edges of the wedge-shape volumes.

2. A forming assembly as set forth in claim 1, comprising a uniformly-thick central region between the laterally-spaced protrusions.

3. A forming assembly as set forth in claim 1, where the central region has a flat upper surface between the laterally-spaced protrusions.

4. A forming assembly as set forth in claim 1, where the bottom surface is flat.

5. A forming assembly as set forth in claim 1, where the parallel ridges extend from the upstream end a distance less than the length dimension.

6. A forming assembly as set forth in claim 1, comprising a step change in a height of an upper surface of the laterally-spaced protrusions laterally outwardly positioned relative to the parallel ridges.

7. A forming assembly as set forth in claim 1, where the internal forming device is symmetric about a lengthwise-extending vertical plane, and each of the laterally-spaced protrusions is a mirror image of the other about a lengthwise-extending vertical plane.

8. A forming assembly as set forth in claim 1, further comprising a mounting element secured to the internal forming device adjacent the upstream end between the protrusions.

9. A forming assembly as set forth in claim 8, further comprising a laterally-centered rudder that extends at least one of beyond a bottom surface of the internal forming device in a direction opposite the protrusions and beyond an upstream end of the internal forming device.

10. A forming assembly as set forth in claim 1, further comprising an external forming device that includes a converging chute that converges from an inlet at an upstream end to a relatively smaller outlet at a downstream end, where the internal forming device is telescopically received within the external forming device.

11. A forming assembly as set forth in claim 10, where the internal forming device is mounted to the external forming device.

12. A forming assembly as set forth in claim 1, where the bottom surface is planar.

13. A forming as set forth in claim 1, where the protrusions have circular cross-sections at the downstream end of the internal forming device.

* * * * *